(12) United States Patent
Enda et al.

(10) Patent No.: US 7,196,745 B2
(45) Date of Patent: Mar. 27, 2007

(54) ACTIVE ELEMENT SUBSTRATE WITH SIMPLIFIED SIGNAL LINE ARRANGEMENT HAVING ACTIVE ELEMENTS AND PIXEL ELECTRODES AND LIQUID CRYSTAL DISPLAY DEVICE USING THE SAME

(75) Inventors: Kenji Enda, Taki-gun (JP); Masanori Takeuchi, Matsusaka (JP); Nobuyoshi Nagashima, Matsusaka (JP); Naofumi Kondo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 10/929,441

(22) Filed: Aug. 31, 2004

(65) Prior Publication Data

US 2005/0046764 A1    Mar. 3, 2005

(30) Foreign Application Priority Data

| Sep. 2, 2003 | (JP) | ............................. 2003-310636 |
| Jul. 9, 2004 | (JP) | ............................. 2004-203939 |

(51) Int. Cl.
*G02F 1/1368* (2006.01)
*G02F 1/1345* (2006.01)

(52) U.S. Cl. .......................... 349/38; 349/43; 349/143; 349/146

(58) Field of Classification Search .................. 349/37, 349/38, 39, 43, 110, 143–146; 345/92
See application file for complete search history.

(56) References Cited

U.S. PATENT DOCUMENTS

| 4,600,274 A | 7/1986 | Morozumi .................. 349/109 |
| 4,642,619 A | 2/1987 | Togashi ....................... 345/695 |
| 4,653,862 A | 3/1987 | Morozumi .................. 349/109 |
| 4,716,403 A | 12/1987 | Morozumi ..................... 345/88 |
| 5,535,028 A * | 7/1996 | Bae et al. .................... 349/145 |
| 5,953,084 A | 9/1999 | Shimada et al. .............. 349/38 |
| 5,953,088 A * | 9/1999 | Hanazawa et al. .......... 349/110 |
| 6,052,162 A | 4/2000 | Shimada et al. .............. 349/38 |
| 6,097,452 A | 8/2000 | Shimada et al. .............. 349/38 |

(Continued)

FOREIGN PATENT DOCUMENTS

JP    2-118521    5/1990

(Continued)

*Primary Examiner*—Toan Ton
*Assistant Examiner*—Tai Duong
(74) *Attorney, Agent, or Firm*—Nixon & Vanderhye P.C.

(57) ABSTRACT

An active element substrate and an opposed substrate sandwich a liquid crystal layer to constitute a liquid crystal display device. On the active element substrate, two signal lines respectively charge a pair of pixels that are adjacent to each other in a direction parallel to scanning lines. The two signal lines are provided intensively on a pixel electrode of one of the pair of pixels. In the direction parallel to the scanning lines, a pixel electrode on which signal lines are provided, and a pixel electrode on which signal lines are not provided, are arrayed alternately. This arrangement makes it possible to reduce, while ensuring a wide process margin, the fluctuation of the potential of a terminal to be connected to a pixel electrode (the fluctuation of the potential occurs during OFF-period of an active element due to capacitances respectively provided at superimposed portions of signal lines and a pixel electrode), to simplify the arrangement of signal lines, and to improve the aperture ratio.

8 Claims, 18 Drawing Sheets

U.S. PATENT DOCUMENTS

| | | | |
|---|---|---|---|
| 6,172,729 B1 * | 1/2001 | Ikeda | 349/145 |
| 6,195,138 B1 | 2/2001 | Shimada et al. | 349/42 |
| 6,259,493 B1 | 7/2001 | Nakamura et al. | |
| 6,275,274 B1 * | 8/2001 | Kanemori et al. | 349/42 |
| 6,433,851 B2 | 8/2002 | Shimada et al. | 349/138 |
| 6,633,360 B2 * | 10/2003 | Okada et al. | 349/145 |
| 2002/0003588 A1 | 1/2002 | Okada et al. | |
| 2004/0017521 A1 | 1/2004 | Okada et al. | |
| 2005/0078263 A1 * | 4/2005 | Kim et al. | 349/144 |

FOREIGN PATENT DOCUMENTS

| | | |
|---|---|---|
| JP | 3-078390 | 4/1991 |
| JP | 10-253988 | 9/1998 |
| JP | 11-352513 | 12/1999 |
| JP | 2001-281682 | 10/2001 |
| JP | 2001-281696 | 10/2001 |
| JP | 2005-24680 | 1/2005 |
| KR | 1998-037482 | 8/1998 |

* cited by examiner

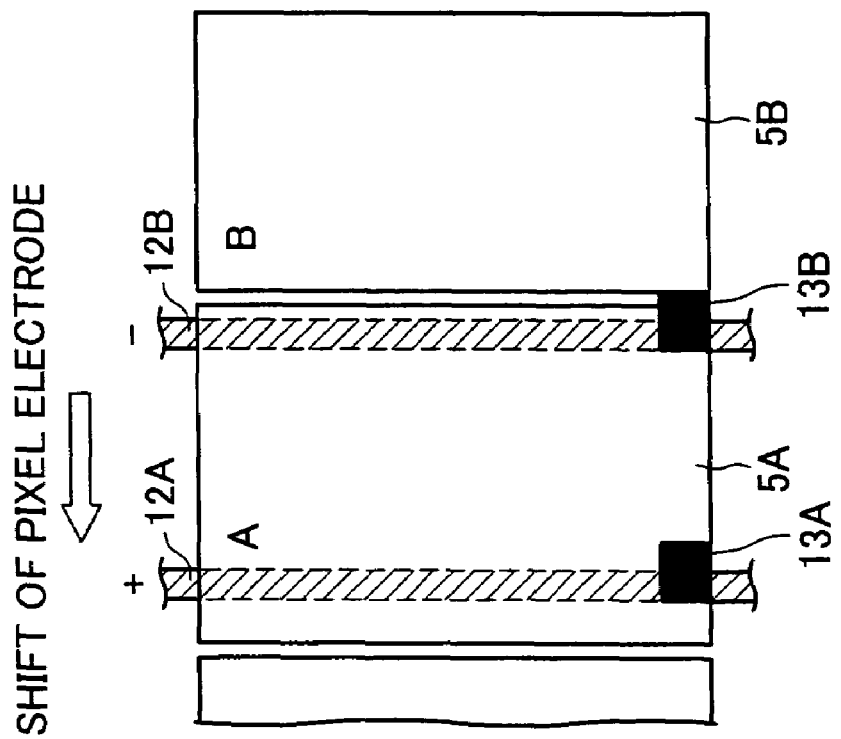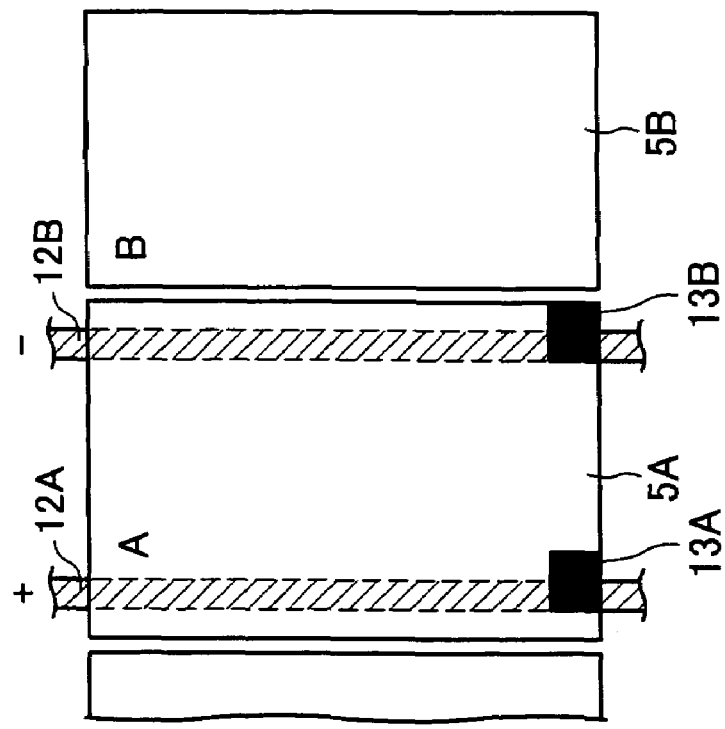

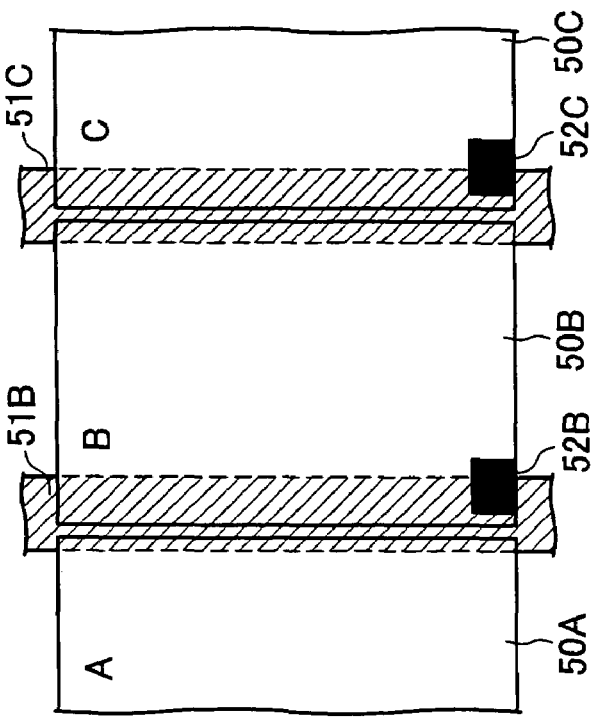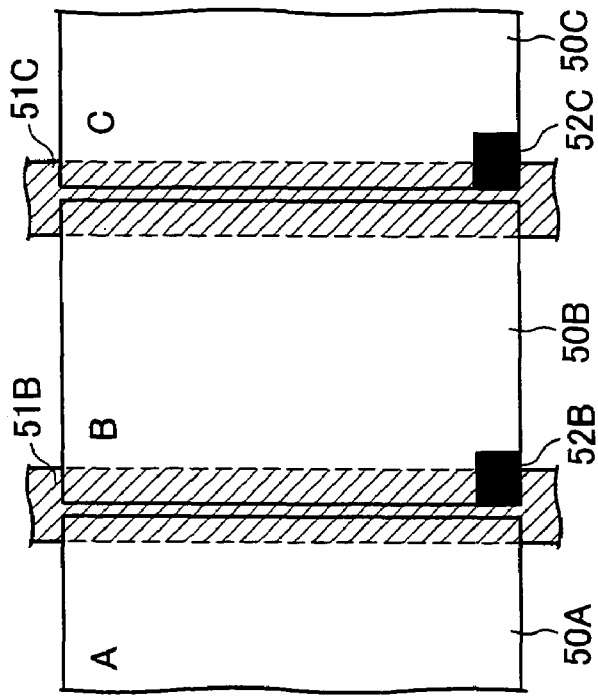

ACTIVE ELEMENT SUBSTRATE WITH SIMPLIFIED SIGNAL LINE ARRANGEMENT HAVING ACTIVE ELEMENTS AND PIXEL ELECTRODES AND LIQUID CRYSTAL DISPLAY DEVICE USING THE SAME

This nonprovisional application claims priority under 35 U.S.C. § 119(a) on Patent Application No. 310636/2003 filed in Japan on Sep. 2, 2003, and Patent Application No. 203939/2004 filed in Japan on Jul. 9, 2004. The entire contents of these applications are hereby incorporated by reference.

FIELD OF THE INVENTION

The present invention relates to an active element substrate in which each pixel is provided with an active element (e.g. a thin-film transistor, a field-effect transistor, a diode) and a pixel electrode, and relates to a liquid crystal display device using the active element substrate.

BACKGROUND OF THE INVENTION

In the field of liquid crystal display devices, recent trend is the widespread use of active matrix liquid crystal display devices in which each pixel has a nonlinear active element (e.g. a thin-film transistor, a field-effect transistor, a diode). This is because such active matrix liquid crystal display devices can attain excellent image quality by reducing unnecessary signal interferences.

Such active matrix liquid crystal display devices prevent deterioration of image quality by performing alternating driving. In the alternating driving, voltages applied to the liquid crystal layer have alternately opposite polarities. This driving method is classified primarily into two types: line inversion driving and dot inversion driving. In the line inversion driving, polarities of the voltages applied to the liquid crystal layer are alternated on scanning lines. In the dot inversion driving, polarities of the voltages applied to the liquid crystal layer are alternated on signal lines. The special frequency can be set higher in the dot inversion driving than in the line inversion driving. Therefore, the dot inversion driving can attain more excellent display quality.

In a liquid crystal device that uses, for example, TFTs (thin-film transistors) as active elements, a TFT substrate and an opposed substrate are provided, and a liquid crystal layer is sandwiched therebetween. On the TFT substrate, a plurality of signal lines and a plurality of scanning lines intersect, and a TFT and a pixel electrode are provided at each intersection. On the opposed substrate, a common electrode is provided. Each TFT is connected to a scanning line via a gate electrode, to a signal line via a source electrode, and to a pixel electrode via a drain electrode.

In such a liquid crystal display device, while a TFT is ON, a current flows from the signal line to the drain, thereby charging a liquid crystal capacitance Clc, which is provided by the pixel electrode, common electrode, and liquid crystal layer. While the TFT is OFF, the voltage applied to the liquid crystal capacitance Clc is retained.

Conventionally, the pixel electrode is located in a compartment formed by scanning lines and signal lines. However, according to a recently used arrangement, the aperture ratio is increased by superimposing the pixel electrode on the signal lines and scanning lines. To adopt this arrangement, the pixel electrode is isolated from the signal lines and scanning lines by an interlayer insulating film. FIG. 13(a) illustrates an arrangement in which pixel electrodes 50 are superimposed on signal lines 51. In FIG. 13(a), with respect to arbitrary three pixels A, B, and C, an arrangement of pixel electrodes 50A, 50B, and 50C, and signal lines 51B and 51C are illustrated. In FIG. 13(a), the pixels A, B, and C are arrayed in the lateral direction, which is parallel to the scanning lines. The signal lines 51B and 51C respectively charge the pixels B and C (to be more accurate, the signal lines 51B and 51C charge the liquid crystal capacitance Clc). The signal line 51B is connected to the pixel electrode 50B via the TFT 52B. The signal line 51C is connected to the pixel electrode 50C via the TFT 52C. In the following description, alphabets (A, B, C, etc.) are omitted from reference numerals, in the cases where it is not particularly required to discriminate pixels.

The signal line 51B is provided in such a manner as to bridge the adjacent pixel electrodes 50A and 50B, thereby filling the gap therebetween. Likewise, the signal line 51C is provided in such a manner as to bridge the adjacent pixel electrodes 50B and 50C, thereby filling the gap therebetween.

With this arrangement, in which the pixel electrodes 50 are superimposed on the signal lines 51 and/or on the scanning lines, capacitances are provided by the signal lines 51 and/or the scanning lines, the pixel electrodes 50, and superimposed portions of the insulating layer. Among the capacitances, particularly of note are capacitances Csd. The capacitances Csd are provided by the pixel electrode 50, the signal lines 51, and the interlayer insulating film provided therebetween. During an OFF-period of a TFT, there is always a signal flowing on a signal line 51 corresponding to the TFT. The signal is a write signal to be supplied to a pixel electrode 50 corresponding to a scanning line other than the scanning line corresponding to the TFT. Therefore, the drain voltage fluctuates through the capacitances Csd. Accordingly, the voltage to be retained in the liquid crystal capacitance Clc also fluctuates. In the case of color display, change of hue is caused if the voltage to be retained in the liquid crystal capacitance Clc fluctuates.

The dot inversion driving, in which the polarities are alternated on the signal lines, can effectively reduce the fluctuation of the drain voltage occurring through the capacitance Csd. In the dot inversion driving, the polarity of the signal (voltage) applied to a signal line 51 is inverted at each horizontal scanning period, which is determined appropriately. Therefore, there is a 180-degree difference between the phases of adjacent signal lines 51. As a result, although the influences on the drain potential cannot be eliminated, it is possible to cause the influences on the drain potential to be directly opposite, so that the influences cancel out each other.

The fluctuation $\Delta Vdr$ of the drain potential in each pixel is represented by the following formula:

$$\Delta Vdr = Csd1/Cpix \times \Delta Vs1 + Csd2/Cpix \times \Delta Vs2$$

where Csd1 is a capacitance provided by a signal line 51 for charging the drain, a pixel electrode 50, and an interlayer insulating film; Csd2 is a capacitance provided by an adjacent signal line 51, the pixel electrode, and the interlayer insulating film; Cpix is a sum of capacitances associated with the drain; $\Delta Vs1$ is a value of voltage fluctuation obtained by subtracting a pre-change potential of the signal line 51 for charging the drain from a post-change potential of the signal line 51 for charging the drain; and $\Delta Vs2$ is a value of voltage fluctuation obtained by subtracting a pre-change potential of a signal line 51 for charging an adjacent pixel from a post-change potential of the signal line 51 for charging the adjacent pixel.

According to FIG. 13(a), the formula can be explained as follows: Csd1 is a capacitance provided by the signal line 51B (which charges the drain of the TFT 52B), the pixel electrode 50B, and the interlayer insulating film; Csd2 is a capacitance provided by the adjacent signal line 51C, the pixel electrode 50B, and the interlayer insulating film; Cpix is a sum of capacitances associated with the drain; ΔVs1 is a value of voltage fluctuation obtained by subtracting a pre-change potential of the signal line 51B (which charges the drain of the TFT 52B) from a post-change potential of the signal line 51B (which charges the drain of the TFT 52B); and ΔVs2 is a value of voltage fluctuation obtained by subtracting a pre-change potential of the adjacent signal line 51C from a post-change potential of the adjacent signal line 51C.

FIG. 15 is a schematic diagram illustrating the fluctuation of the drain potential of the TFT 52B. The fluctuation is caused by signals respectively flowing on the signal lines 51B and 51C. As shown in FIG. 15, if ΔVs1 is a positive value, ΔVs2 is a negative value, and vice versa. If the values of Csd1 and Csd2 are equal, and absolute values of ΔVs1 and ΔVs2 are equal, the influences on the drain potential are completely cancelled out.

Therefore, in a conventional arrangement, the signal lines 51B and 51C are superimposed on the pixel electrode 50B so that the superimposed areas are identical on the signal line 51B and on the signal line 51C, as shown in FIG. 13(a) and FIG. 14(a) (cross-sectional view of FIG. 13(a)).

However, even if the two signal lines 51B and 51C are respectively provided at both edges of the pixel electrode 50B so that the superimposed areas are identical on the two signal lines 51B and 51C, the superimposed areas change if the pixel electrode 50B is shifted with respect to the two signal lines 51B and 51C, as shown in FIG. 13(b) and FIG. 14(b) (cross-sectional view of FIG. 13(b). Therefore, the values of Csd1 and Csd2, which are respectively formed at both edges of the pixel electrode 50B, are different. If the values of Csd1 and Csd2 are different, the influences on the drain potential are different. As a result, ΔVdr differs between a shifted region and a normal region. Therefore, effective values are different between the shifted region and the normal region. The difference is observed as uneven display.

In order to reduce the change of the values of Csd1 and Csd2 caused by the shift of the pixel electrode with respect to the signal lines, the following arrangement (ladder structure) is proposed. In FIG. 13(a), the signal line 51B is provided so as to bridge the adjacent signal lines 50A and 50B. On the other hand, according to the ladder structure, two branch signal lines 51B-1 and 51B-2 are provided, as shown in FIG. 16(a) and FIG. 17(a) (cross-sectional view of FIG. 16(a)). The branch signal line 51B-1 is located within the region of the pixel electrode 50A, and the branch signal line 51B-2 is located within the region of the pixel electrode 50B.

FIG. 18 is a plan view illustrating a TFT substrate that adopts the ladder structure. In FIG. 18, the plurality of lines extending in the lateral direction are scanning lines 53. The plurality of lines intersecting the scanning lines 53 are signal lines 51. Indicated by virtual lines, pixel electrodes 50 are provided so as to be superimposed at peripheral portions on the scanning lines 53 and signal lines 51. On a light transmitting substrate (not shown) made of such material as glass, the scanning lines 53, the signal lines 51, and the pixel electrodes 50 are provided in this order. Between an electrode layer including the scanning lines 53 and an electrode layer including the signal lines 51, a gate insulating film (not shown) is provided. Between the electrode layer including the signal lines 51 and an electrode layer including the pixel electrodes 50, an interlayer insulating film (not shown) is provided.

Here, attention is focused on the pixel B. The signal line 51B is divided into the branch signal lines 51B-1 and 51B-2, except the portion at which the TFT 52B (hatching part) is located. The branch signal lines 51B-1 and 51B-2 are provided within the regions of the two adjacent pixel electrodes 50A and 50B, respectively. In FIG. 18, the reference numeral 55 indicates a Cs wire, and the reference numeral 54 indicates a Cs electrode. The Cs wire and the Cs electrode provide a storage capacitance. The Cs wire 55 is provided in the same electrode layer with the scanning lines 53, and the Cs electrode 54 is provided in the same electrode layer with the signal lines 51.

According to this structure, if there is an enough distance between two branch signal lines 51-1 and 51-2, the superimposed areas of the pixel electrode 50B and the branch signal lines 51B-2 and 51C-1, which are respectively provided at both edges of the pixel electrode 50B, do not change (see FIG. 16(b) and FIG. 17(b)), even if the pixel electrode 50 is shifted with respect to the signal lines 51. Thus, the difference between the values of Csd1 and Csd2 can be reduced. As a result, it is possible to set a wide process margin (see, for example, Japanese Publication for Unexamined Patent Application, Tokukaihei No. 09-152625 (publication date: Jun. 10, 1997; corresponding to U.S. Pat. No. 6,052,162, No. 5,953,084, No. 6,097,452, No. 6,195,138B1, and No. 6,433,851B2), and Japanese Publication for Unexamined Patent Application, Tokukaihei No. 10-253988 (publication date: Sep. 25, 1998)).

The explanation above uses TFTs as one example of active elements, the influences of parasitic capacitances formed by the pixel electrode and the signal lines are described as a fluctuation of potential of the drain (drain terminal). The same holds true with other active elements, such as field-effect transistors and diodes. That is, the potential of the terminal connected to the pixel electrode fluctuates due to the influences of the parasitic capacitances.

In general, a color-display liquid crystal display device has color filters of three primary colors (red, blue, and green). The color filters of three primary colors constitute a block, and the blocks are arranged in a mosaic-like shape or in strips. Other than such a liquid crystal display device having color filters of odd-number cycle, there is a liquid crystal display device having color filters of even-number cycle, in which the four kinds of filters (red, blue, green, and, in addition, white) constitute a block, and the blocks are arrayed in matrix. An example of the liquid crystal display device having color filters of even-number cycle is disclosed in Japanese Publication for Unexamined Patent Publication, Tokukaihei 02-118521 (publication date: May 2, 1990). With this arrangement, the use of the white filter increases the overall brightness.

However, the ladder structure is inevitably complex, because a signal line 51 of each pixel is divided into two. Moreover, because the two signal lines 51-1 and 51-2 are provided with respect to each pixel electrode 50, the areas occupied by the signal lines 51 is increased with respect to the areas of apertures. As a result, the aperture ratio decreases.

SUMMARY OF THE INVENTION

An object of the present invention is to provide an active element substrate and a liquid crystal display device that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

To attain the foregoing object, a first active element substrate of the present invention includes a plurality of signal lines; a plurality of scanning lines intersecting the signal lines; an active element provided at each intersection between the signal lines and the scanning lines; and a pixel electrode provided at each intersection between the signal lines and the scanning lines, the pixel electrode being superimposed at least on the signal lines, wherein: signal lines respectively corresponding to a pair of pixel electrodes are provided intensively on one of the pair of pixel electrodes so as to be located between edges of said one of the pair of pixel electrodes, the pair of pixel electrodes being adjacent to each other in a direction parallel to the scanning lines.

Note that a signal line corresponding to a pixel electrode means a signal line that charges a pixel including the pixel electrode. From the side of the signal line, the pixel electrode charged by the signal line can be expressed as a corresponding pixel electrode. Also not that, although such expressions as "signal lines are provided on a pixel electrode" is used in order to describe the superimposition of the signal lines and pixel electrode, this does not mean a hierarchical relationship on the substrate among the signal lines, scanning lines, and pixel electrodes. To provide easy-to-understand explanation, TFTs are used as an example of active elements, and effects of the present invention are described using the phenomena caused in the case of TFTs.

According to this arrangement, the signal lines respectively corresponding to the pair of pixel electrodes are provided only on one of the pair of pixel electrodes. Therefore, on a pixel electrode, two signal lines (including a signal line corresponding to an adjacent pixel electrode) are provided, or no signal line is provided at all.

If such an active element substrate is used in the liquid crystal display device that is driven by the dot inversion driving, in a pixel of a pixel electrode on which two signal lines are provided, fluctuations of the drain (an example of the terminal connected to the pixel electrode) potential occurs in opposite directions, the fluctuation occurring during an OFF-period of a thin-film transistor (an example of an active element) through the capacitances Csd1 and Csd2 respectively provided at superimposed portions. Therefore, as in the ladder structure described above, it is possible to reduce the fluctuation of the drain potential caused by the capacitances Csd (Csd1 and Csd2), thereby improving display quality.

In addition, the two signal lines provided on a pixel electrode are located between edges of the pixel electrode, the edges being parallel to the signal lines. Therefore, even if the pixel electrode is shifted with respect to the signal lines, the area of the superimposed portions of the signal lines and the pixel electrode does not change. As a result, the capacitances provided at the positions where the two signal lines are respectively provided are low. This makes it possible to set a wide process margin.

On the other hand, in a pixel in which no signal line is provided on a pixel electrode, capacitances are respectively provided by oblique electric fields between the signal lines and the pixel electrode, if signal lines are provided in adjacent pixels. However, the two signal lines that respectively provide the capacitances by means of the oblique electric fields are supplied with signals of opposite polarities, respectively. Therefore, the influences exerted through the capacitances on the drain potential cancel out each other.

Even if the pixel electrode is shifted with respect to the signal lines, the influence of the shift on the capacitances respectively provided by the oblique electric fields are too small to be a problem. This is because the pixel electrode and the signal lines are distanced (not superimposed).

Such an arrangement is simpler than the conventional ladder structure, because the signal lines of each pixel are not divided. In addition, the aperture ratio of the panel as a whole is improved, because the area occupied by the signal lines with respect to the area of apertures is reduced. This is particularly suitable for a high-definition liquid crystal display device having a short pixel pitch.

Therefore, there is an effect that it is possible to provide an active element substrate that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

To attain the foregoing object, a second active element substrate of the present invention includes a plurality of signal lines; a plurality of scanning lines intersecting the signal lines; an active element provided at each intersection between the signal lines and the scanning lines; and a pixel electrode provided at each intersection between the signal lines and the scanning lines, the pixel electrode being superimposed at least on the signal lines, wherein: each of the signal lines includes a portion provided on a corresponding pixel electrode and a roundabout portion provided on a pixel electrode that is adjacent, in a direction parallel to the scanning lines, to said corresponding pixel electrode; and, on each pixel electrode, a portion of a corresponding signal line and a roundabout portion of a signal line corresponding to an adjacent pixel electrode form a pair, and the pair is located between edges of the pixel electrode except those portions that lie between pixel electrodes.

Again, a signal line corresponding to a pixel electrode means a signal line that charges a pixel including the pixel electrode. From the side of the signal line, the pixel electrode charged by the signal line can be expressed as a corresponding pixel electrode. Also not that, although such expressions as "signal lines are provided on a pixel electrode" is used in order to describe the superimposition of the signal lines and pixel electrode, this does not mean a hierarchical relationship on the substrate among the signal lines, scanning lines, and pixel electrodes. To provide easy-to-understand explanation, TFTs are used as an example of active elements, and effects of the present invention are described using the phenomena caused in the case of TFTs.

According to the foregoing arrangement, each signal line includes a roundabout portion, and, on each pixel electrode, a part of a corresponding signal line and a roundabout part of an adjacent signal line are provided as a pair. Therefore, in this case, each pixel electrode includes a portion on which two signal lines are provided (including a signal line corresponding to an adjacent pixel electrode) and a portion on which no signal line is provided at all. Moreover, the two signal lines are located between edges of the pixel electrode, except those portions that lie between pixel electrodes. Therefore, the superimposed area of the signal lines and the pixel electrode does not change, even if the pixel electrode is shifted with respect to the signal lines. As a result, it is possible to reduce the change of values of capacitances provided where partial signal lines are provided as a pair.

Like the first active element substrate described above, if such an active element substrate is used, for example, in the liquid crystal display device that is driven by the dot inversion driving, fluctuations of the drain (an example of the terminal connected to the pixel electrode) potential occurring in each pixel during an OFF-period of a thin-film transistor (an example of an active element) through the capacitances Csd1 and Csd2 respectively provided at superimposed portions can be reduced as in the ladder structure described above, while ensuring a wide process margin. Therefore, display quality is improved. Moreover, the arrangement is simpler as compared with the conventional ladder structure, because the signal lines of each pixel are not divided. In addition, the area occupied by the signal lines with respect to aperture portions is reduced. As a result, the aperture ratio of the panel as a whole is improved. In particular, the forgoing arrangement is advantageous in that the signal lines are allocated to each pixel evenly in terms of the area occupied by the signal lines.

Therefore, as in the case of the first active element substrate, there is an effect that it is possible to provide an active element substrate that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

To attain the foregoing object, a first liquid crystal display device of the present invention includes: a first active element substrate including a plurality of signal lines, a plurality of scanning lines intersecting the signal lines, an active element provided at each intersection between the signal lines and the scanning lines, and a pixel electrode provided at each intersection between the signal lines and the scanning lines, the pixel electrode being superimposed at least on the signal lines, wherein signal lines respectively corresponding to a pair of pixel electrodes are provided intensively on one of the pair of pixel electrodes so as to be located between edges of said one of the pair of pixel electrodes, the pair of pixel electrodes being adjacent to each other in a direction parallel to the scanning lines; an opposed substrate on which a common electrode is provided; and a liquid crystal layer sandwiched between the active element substrate and the opposed substrate, a polarity of a voltage applied to one of two adjacent signal lines being opposite a polarity of a voltage applied to the other of the two adjacent signal lines.

To attain the foregoing object, a second liquid crystal display device of the present invention includes: a second active element substrate including a plurality of signal lines, a plurality of scanning lines intersecting the signal lines, an active element provided at each intersection between the signal lines and the scanning lines, and a pixel electrode provided at each intersection between the signal lines and the scanning lines, the pixel electrode being superimposed at least on the signal lines, wherein each of the signal lines includes a portion provided on a corresponding pixel electrode and a roundabout portion provided on a pixel electrode that is adjacent, in a direction parallel to the scanning lines, to said corresponding pixel electrode, and wherein, on each pixel electrode, a portion of a corresponding signal line and a roundabout portion of a signal line corresponding to an adjacent pixel electrode form a pair, and the pair is located between edges of the pixel electrode except those portions that lie between pixel electrodes; an opposed substrate on which a common electrode is provided; and a liquid crystal layer sandwiched between the active element substrate and the opposed substrate, a polarity of a voltage applied to one of two adjacent signal lines being opposite a polarity of a voltage applied to the other of the two adjacent signal lines.

With the foregoing arrangement, as described above, there is an effect that it is possible to provide a liquid crystal display device that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

Furthermore, the first liquid crystal display device of the present invention may be arranged so that a pixel electrode on which signal lines are provided and a pixel electrode on which no signal line is provided are arrayed alternately in the direction parallel to the scanning lines; an aperture area of a pixel of a pixel electrode on which no signal line is provided is one-half of an aperture area of a pixel of a pixel electrode on which signal lines are provided intensively; and color filters of red, green, and blue are provided so that four adjacent pixel electrodes arrayed in the direction parallel to the scanning lines constitute one color unit, the four adjacent pixel electrodes consisting of two pixel electrodes on which signal lines are provided, and two pixel electrodes on which no signal line is provided, the two pixel electrodes on which no signal line is provided respectively corresponding to color filters of green.

According to this arrangement, the number of green pixels, which have a high level of visibility for human, is twice the number of red and blue pixels. Therefore, higher resolution can be attained as compared with a liquid crystal display device in which the same number of pixels are provided for each color. In addition, because a green filter is provided so as to be opposed to a pixel electrode on which no signal line is provided, the total aperture area is the same among the pixels of red, blue, and green, even if the number of green pixels is twice the number of red and blue pixels. As a result, an excellent white balance is attained.

For a fuller understanding of the nature and advantages of the invention, reference should be made to the ensuing detailed description taken in conjunction with the accompanying drawings.

BRIEF DESCRIPTION OF THE DRAWINGS

FIGS. 5(a) and 5(b) are explanatory diagrams illustrating capacitances Csd provided in a pixel on which signal lines are provided intensively, in a liquid crystal display device using the TFT substrate of FIG. 4.

FIG. 6(a) is a cross-sectional view corresponding to FIG. 5(a), and FIG. 6(b) is a cross-sectional view corresponding to FIG. 5(b).

FIG. 8(a) is a cross-sectional view corresponding to FIG. 7(a), and FIG. 8(b) is a cross-sectional view corresponding to FIG. 7(b).

FIGS. 13(a) and 13(b) are explanatory diagrams illustrating capacitances Csd provided in a pixel, in a liquid crystal display device using a conventional TFT substrate.

FIG. 14(a) is a cross-sectional view corresponding to FIG. 13(a), and FIG. 14(b) is a cross-sectional view corresponding to FIG. 13(b).

FIG. 17(a) is a cross-sectional view corresponding to FIG. 16(a), and FIG. 17(b) is a cross-sectional view corresponding to FIG. 16(b).

DESCRIPTION OF THE EMBODIMENTS

Figure 1:
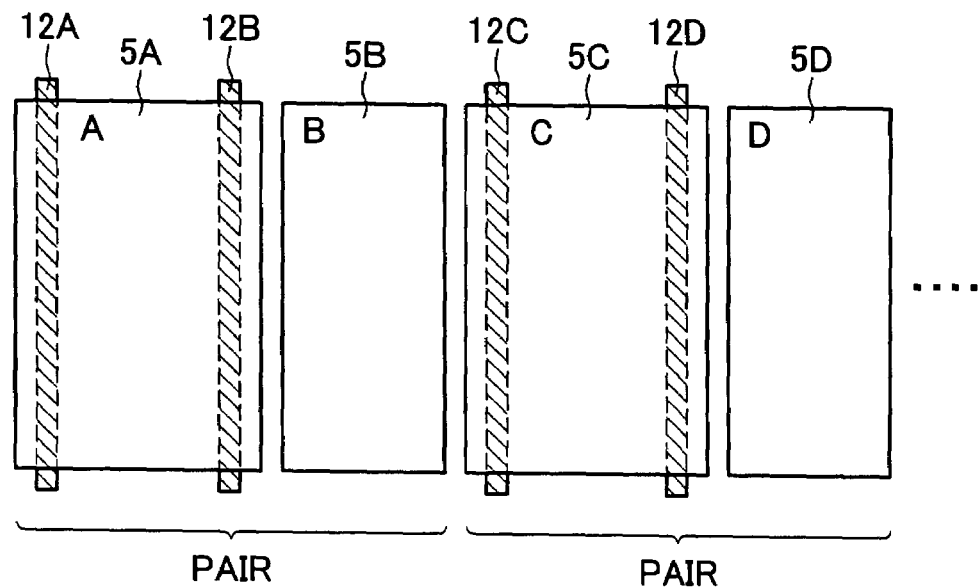
FIG. 1(a) is an explanatory diagram schematically illustrating an arrangement of pixel electrodes and signal lines on a TFT substrate of a first embodiment of the present invention.
FIG. 1(b) is an explanatory diagram schematically illustrating an arrangement of pixel electrodes and signal lines on a TFT substrate of a conventional ladder structure.
Figure 1:
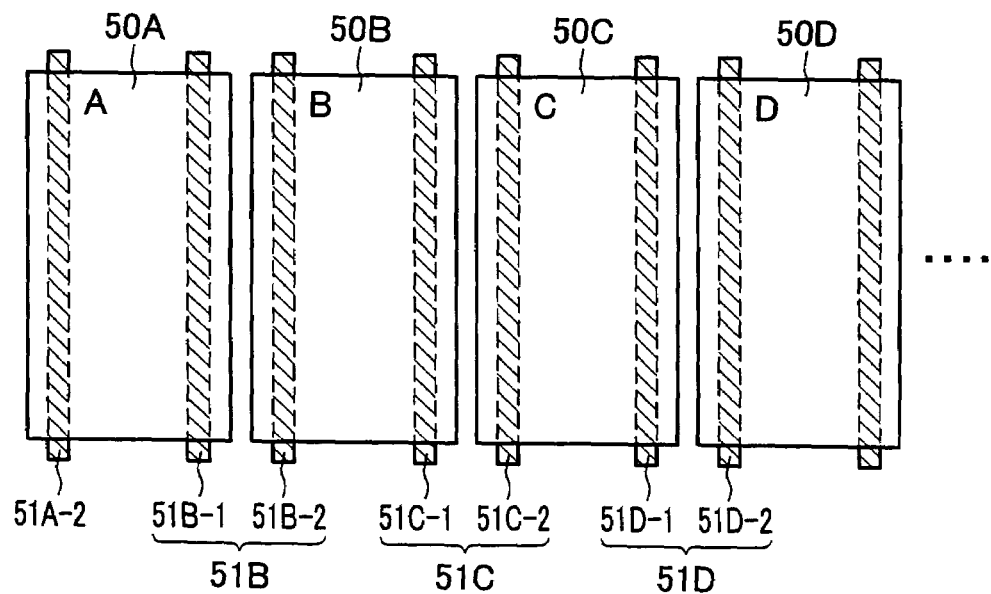
Figure 2:
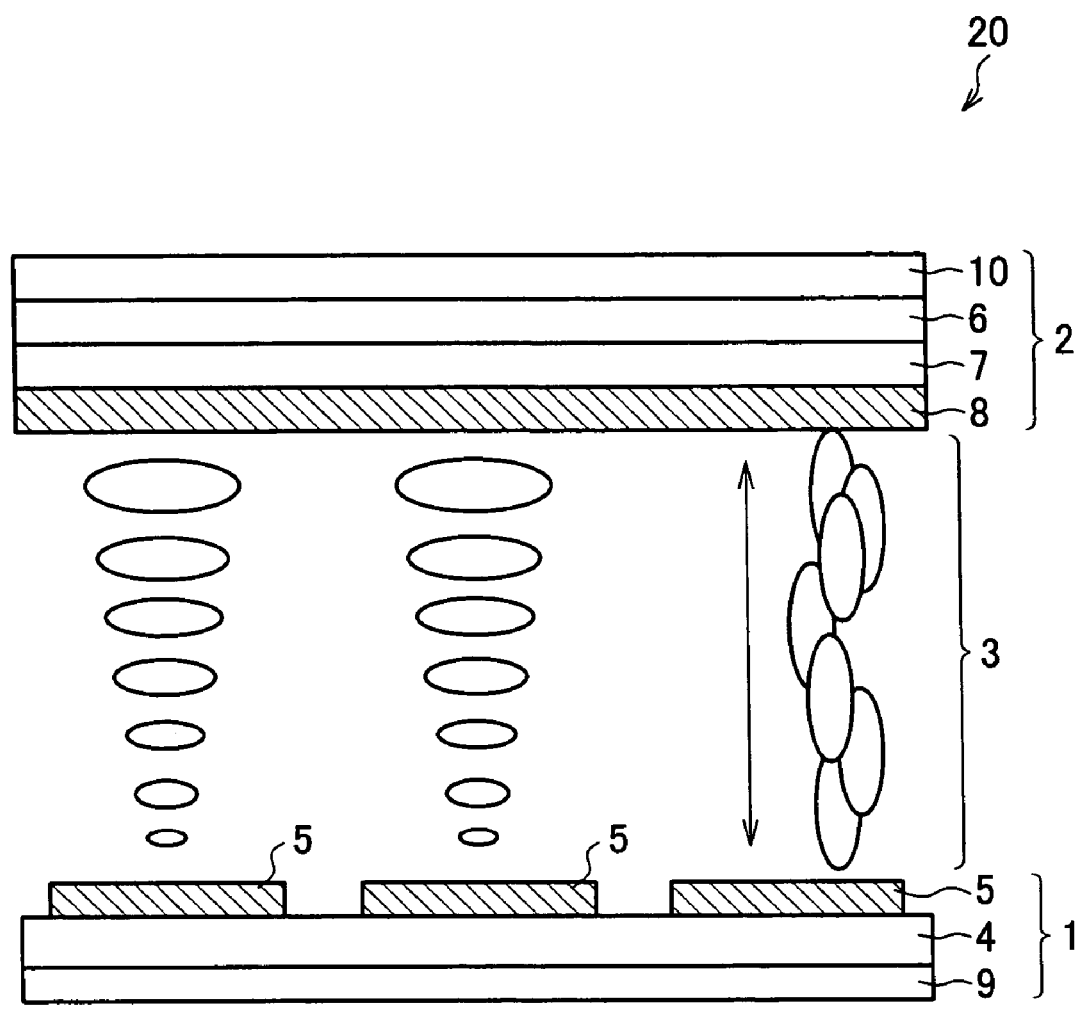
FIG. 2 is an explanatory diagram schematically illustrating an arrangement of a TN-mode liquid crystal display device using a TFT substrate of one of the embodiments of the present invention.

With reference to FIGS. 1 to 12, the following describes one embodiment of the present invention.

Discussed below is a case in which an active element substrate is used in a liquid crystal display device. However, the active element substrate can be used in other display devices, such as an electroluminescence display device. Moreover, the active element substrate can be used in a light-receiving device that stores charge in pixel electrodes, the charge being generated by radiation of light. An example of such a light-receiving device is an X-ray device that receives X-ray. Although the active elements used below are TFTs (thin-film transistors), other active elements (e.g. field-effect transistors, diodes) may be used instead of the TFTs. This is because, as described above, the parasitic capacitances provided by the pixel electrode and signal lines have similar influences, even if other active elements are used.

A TFT substrate (active element substrate) 1 of the following embodiments is one member for sandwiching a liquid crystal layer 3, the other member being an opposed substrate 2. In this way, liquid crystal cells are formed. The liquid crystal cells are sandwiched between a pair of polarizing plates 9 and 10. Thus provided is a liquid crystal display device 20.

The opposed substrate 2 includes a light-transmitting substrate 6, a color filter 7, and a common electrode 8. The light-transmitting substrate 6 is made of such material as glass. The color filter 7 and the common electrode 8 are formed in this order on the light-transmitting substrate 6. On a light-transmitting substrate 4, the TFT substrate 1 (fully described later) has a plurality of signal lines (not shown), a plurality of scanning lines (not shown), TFTs (active elements; not shown), and pixel electrodes 5. The light-transmitting substrate 4 is made of such material as glass. The plurality of scanning lines intersect the plurality of signal lines. The TFTs are respectively provided at intersections between the signal lines and scanning lines.

The liquid crystal layer 3 is made of nematic liquid crystal material having a positive dielectric anisotropy, for example. The long axis of each liquid crystal molecule in the liquid crystal material is substantially parallel to the surfaces of the substrates 4 and 6. Between the upper substrate 6 and the lower substrate 4, the liquid crystal molecules are twisted continually by 90 degrees (twisted alignment). With this liquid crystal layer 3, TN (twisted nematic) mode cells in TN mode can be formed.

In the TN mode liquid crystal display device 20, when no voltage is applied, cells (leftmost pixel and middle pixel in FIG. 2) emit incident linear polarized light after changing the polarization direction of the incident linear polarized light by 90 degrees, by the rotatory power of the cells. On the other hand, when a voltage is applied, the cells (rightmost pixel in FIG. 2) emit the incident linear polarized light without changing the polarization direction. Therefore, if (i) the polarization axis of the polarizing plate (one of the pair of polarizing plates 9 and 10) that is closer to the incident side is parallel to the long axis of each liquid crystal molecule, and (ii) the polarization axis of the polarizing plate (one of the pair of polarizing plates 9 and 10) that is closer to the emission side is perpendicular to the long axis of each liquid crystal molecule, bright display is performed while no voltage is applied, and dark display is performed while a voltage is applied. On the other hand, if the polarization axes of both the polarizing plates 9 and 10 are parallel to the long axis of each liquid crystal molecule, dark display is performed while no voltage is applied, and bright display is performed while a voltage is applied.

Figure 3:
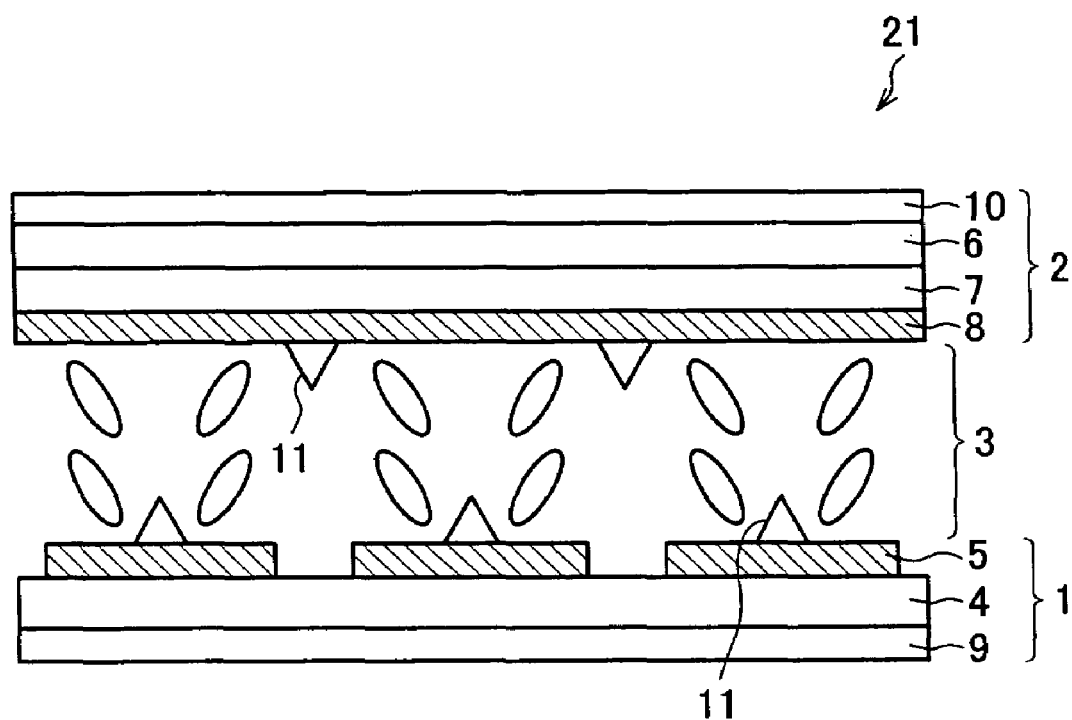
FIG. 3 is an explanatory diagram schematically illustrating an arrangement of an MVA-mode liquid crystal display device using a TFT substrate of one of the embodiments of the present invention.

Alternatively, the following arrangement may be adopted, for example, thereby forming a liquid crystal display device 21. Namely, the liquid crystal layer 3 is made of nematic liquid crystal material having a negative dielectric anisotropy. The long axis of each liquid crystal molecule in the liquid crystal material is substantially vertical to the surfaces of the substrates 4 and 6. As shown in FIG. 3, special protruding patterns 11 are provided on the common electrode 8 of the opposed electrode 2 and on the pixel electrodes 5 of the TFT substrate 1. The patterns 11 on the opposed substrate 2 and the patterns 11 on the TFT substrate 1 are provided so as not to be opposed to each other. This arrangement allows for providing an MVA mode liquid crystal display device having a wide viewing range characteristic.

To prevent the deterioration of image quality, dot inversion driving is performed in the liquid crystal display devices 20 and 21. In the dot inversion driving, the polarities of voltages applied to the liquid crystal layer are alternated on the signal lines.

Discussed below is a substrate structure of the TFT substrate 1 adopted in the liquid crystal devices 20 and 21.

First, with reference to FIGS. 1(*a*) and 1(*b*), the substrate structure of the TFT substrate 1 of a first embodiment is described. FIG. 1(*a*) illustrates how (i) pixel electrodes 5A, 5B, 5C, and 5D of arbitrary four pixels A, B, C, and D, and (ii) signal lines 12A, 12B, 12C, and 12D for respectively charging the pixels A to D are arranged on the TFT substrate 1. In FIG. 1(*a*), the pixels A to D are arrayed in the lateral direction, which is parallel to the scanning lines. For the purpose of comparison, FIG. 1(*b*) illustrates how (i) pixel electrodes 50A, 50B, 50C, and 50D of arbitrary four pixels A, B, C, and D and (ii) signal lines 51A, 51B, 51C, and 51D for respectively charging the pixels A to D are arranged on a TFT substrate in which the conventional ladder structure is adopted.

As shown in FIG. 1(*a*), on the TFT substrate 1, the two pixels A and B are provided adjacent to each other in the direction parallel to the scanning lines, thereby forming a pair. The signal lines 12A and 12B, which respectively charge the pixels A and B, are both provided on the pixel electrode 5A of the pixel A. Therefore, in the row of the pixels A to D, a pixel electrode 5 on which signal lines 12 are provided and a pixel electrode 5 on which signal lines 12 are not provided are arrayed alternately in the direction parallel to the scanning lines (not shown).

As in the ladder structure, the signal lines 12A and 12B are provided between both edges of the pixel electrode 5A, the both edges being parallel to the signal lines 12. The signal lines 12A and 12B are distanced from each other to such a degree as to make up for the shift. Likewise, the signal lines 12C and 12D are provided between both edges of the pixel electrode 5C, the both edges being parallel to the signal lines 12. The signal lines 12C and 12D are distanced from each other as to make up for the shift.

Figure 4:
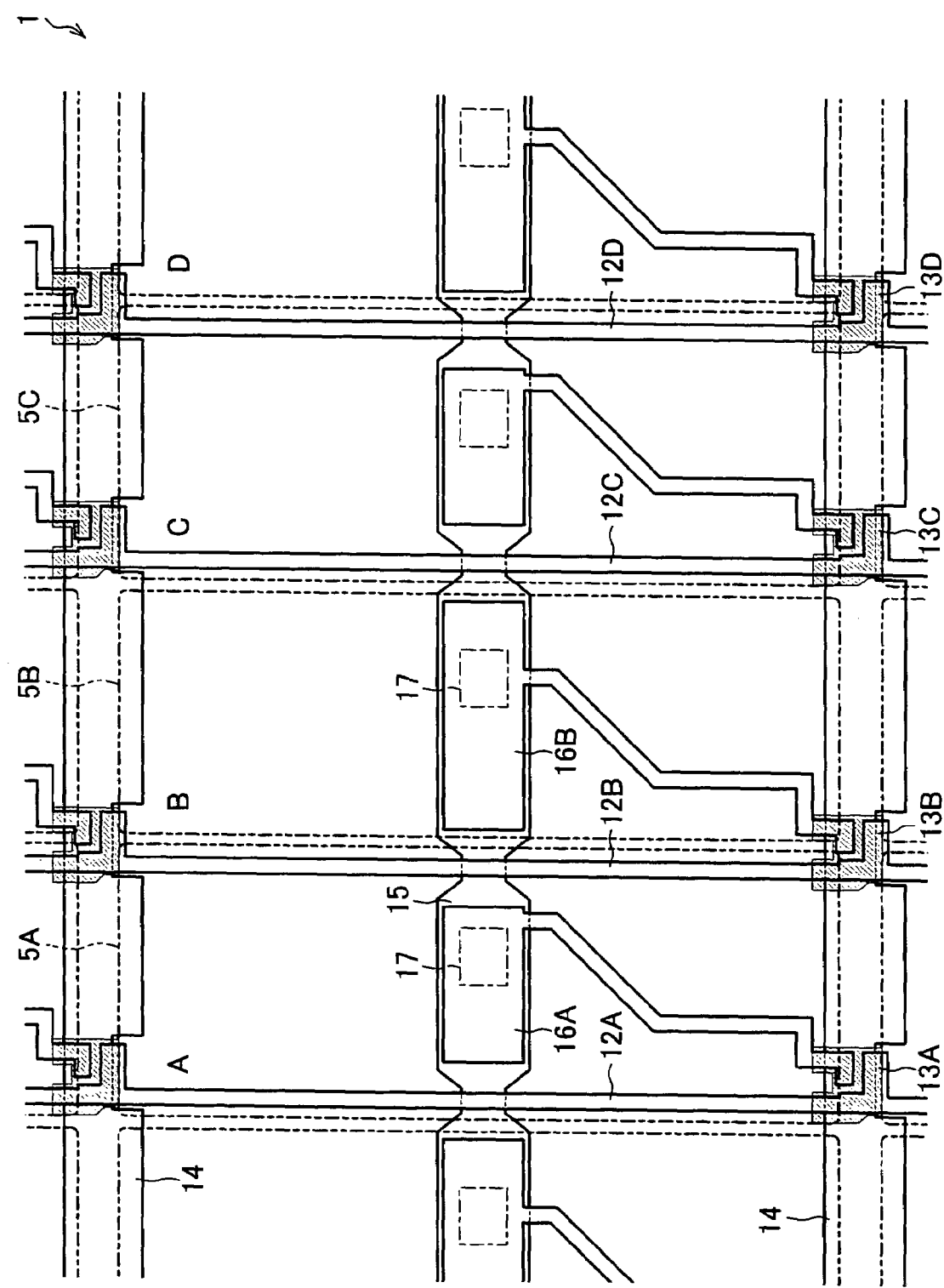
FIG. 4 is a plan view schematically illustrating a structure of the TFT substrate of the first embodiment of the present invention.

FIG. 4 is a plan view illustrating the TFT substrate 1. In FIG. 4, the plurality of lines extending in the lateral direction are scanning lines 14. The plurality of lines intersecting the scanning lines 14 are the signal lines 12. The rectangular members indicated by virtual lines are the pixel electrodes 5. The pixel electrodes 5 are positioned so that peripheral parts thereof are superimposed onto the scanning lines 14 and the signal lines 12. The scanning lines 14, the signal lines 12, and the pixel electrodes 5 are provided in this order on the substrate 4 shown in FIG. 2 or FIG. 3. The substrate 4 is made of such material as glass. Between an electrode layer including the scanning line 14 and an electrode layer including the signal line 12, a gate insulating film (not shown) is provided. Between the electrode layer including the signal lines 12 and an electrode layer including the pixel electrodes 5, an interlayer insulating film (not shown) is provided. In FIG. 4, the members indicated by the reference numeral 13 are TFTs (active elements) for supplying signals to the pixel electrodes 5, the signals being applied to the signal lines 12.

As explained above with reference to FIG. 1(*a*), each pair of signal lines 12 are provided on either one of two pixel electrodes 5 that form a pair in the direction parallel to the scanning lines 14.

In FIG. 4, the member indicated by reference numeral 15 is a Cs wire, and the member indicated by reference numeral 16 is a Cs electrode. The Cs wire and the Cs electrode provide a storage capacitance. The Cs wire is provided between each pair of the scanning electrodes 14. The Cs wire is provided in the same electrode layer with the scanning lines 14. The storage capacitance is provided at an superimposed portion of the Cs wire 15 and the Cs electrode 16, by the Cs wire 15, the Cs electrode 16, and the gate insulating film provided therebetween. The member 17, which is provided to each pixel and indicated by chain line, is a contact hole for connecting the Cs electrode 16 and the pixel electrode 5.

As shown in FIG. 4, on the TFT substrate 1, in the direction parallel to the scanning lines 14, the pixel electrode 5 is larger in the pixels A and C (in which the signal lines 12 are provided intensively) than in the pixels B and D (in which the signal lines 12 are not provided). This arrangement is adopted so as to equalize the aperture area in the pixel A and the aperture area in the pixel B. By thus equalizing the aperture areas, an excellent white balance is attained.

Figure 6:
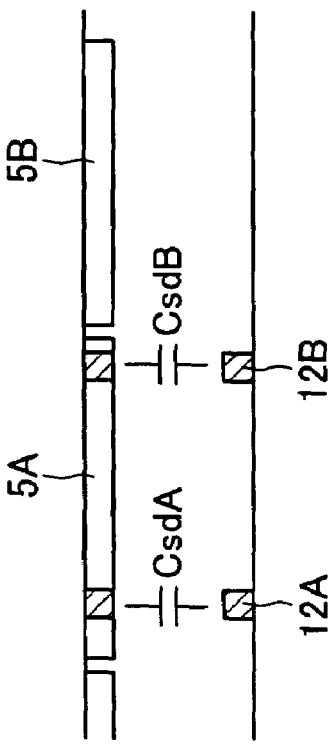
FIGS. 6(a) and 6(b) are explanatory diagrams illustrating capacitances Csd provided in a pixel on which signal lines are provided intensively, in the liquid crystal display device using the TFT substrate of FIG. 4.
Figure 6:
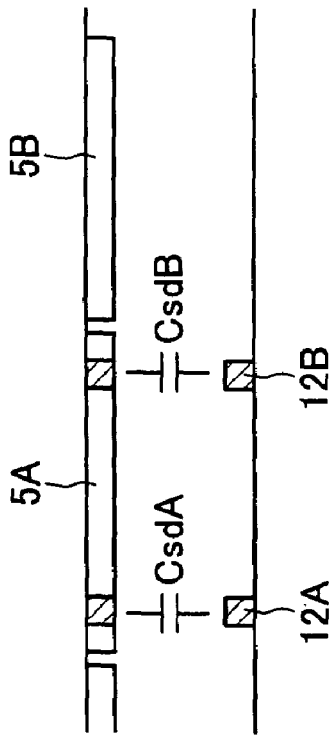
Figure 7:
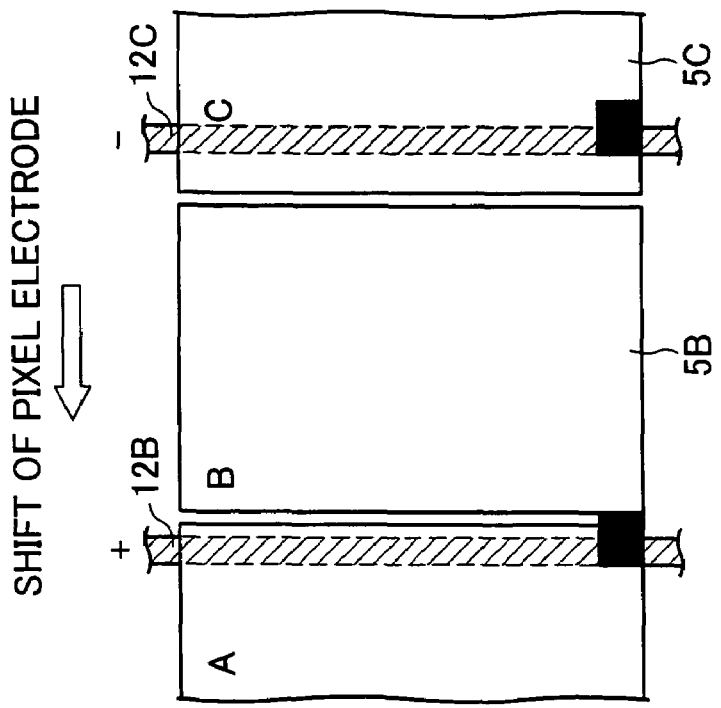
FIGS. 7(a) and 7(b) are explanatory diagrams illustrating capacitances Csd provided in pixels on which no signal line is provided, in the liquid crystal display device using the TFT substrate of FIG. 4.
Figure 7:
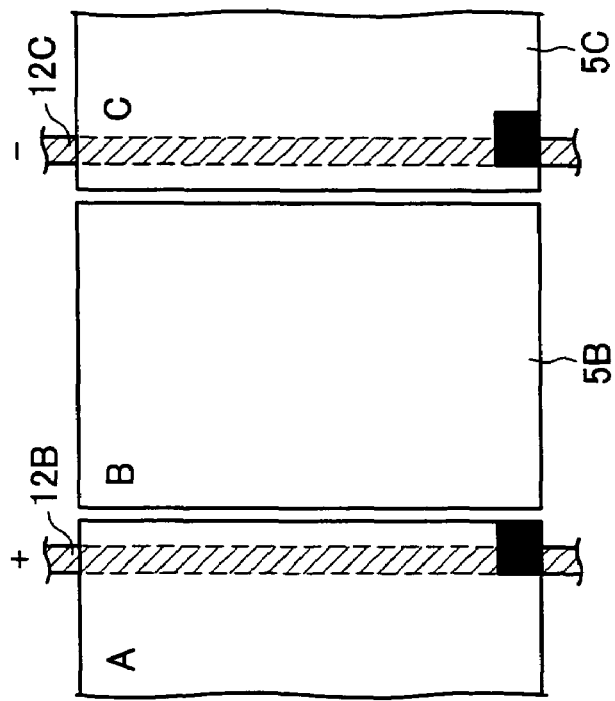
Figure 8:
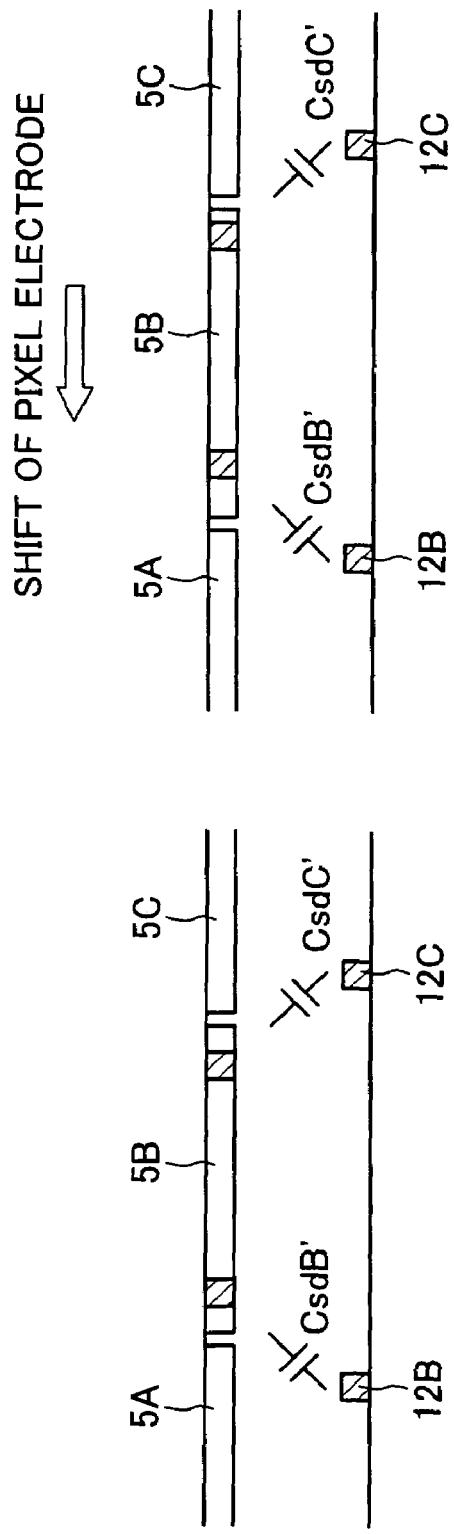
FIGS. 8(a) and 8(b) are explanatory diagrams illustrating capacitances Csd provided in pixels on which no signal line is provided, in the liquid crystal display device using the TFT substrate of FIG. 4.

Next, capacitances Csd provided in each pixel according to the foregoing arrangement is described, with reference to FIGS. 5(*a*) and 5(*b*), FIGS. 6(*a*) and 6(*b*) (cross-sectional views of FIG. 5(*a*) and 5(*b*)), FIGS. 7(*a*) and 7(*b*), and FIGS. 8(*a*) and 8(*b*) (cross-sectional views of FIG. 7(*a*) and 7(*b*)).

First, with reference to FIGS. 5(*a*) and 5(*b*), and FIGS. 6(*a*) and 6(*b*) (cross-sectional views of FIG. 5(*a*) and 5(*b*)), the capacitances Csd provided in the pixel A, on which two signal lines 12 are provided, is described (the following description is also applicable to the pixel C).

In the pixel A, the signal line 12A and the signal line 12B are provided. Therefore, as shown in FIGS. 5(*a*) and 6(*a*), at those portions where the pixel electrode 5A is superimposed through the interlayer insulating film (not shown) onto the signal lines 12A and 12B, capacitances CsdA and CsdB are provided, respectively. As described above, there is always a signal flowing on the signal line 12A, even in an OFF-period of the TFT 13A. Therefore, the drain potential of the TFT 13A fluctuates through the capacitances CsdA and CsdB, as the potential of the signal line 12A fluctuates. As described above, the fluctuation $\Delta Vdr$ caused by the fluctuation of the potential on the signal lines 12A and 12B is represented by the following formula:

$$\Delta Vdr = CsdA/Cpix \times \Delta VsA + CsdB/Cpix \times \Delta VsB$$

where CsdA is a capacitance provided by the signal line 51A (which charges the drain electrode of the TFT 13A), the pixel electrode 5A, and the interlayer insulating film; CsdB is a capacitance provided by the adjacent signal line 12B, the pixel electrode 5A, and the interlayer insulating film; Cpix is a sum of capacitances associated with the drain; $\Delta VsA$ is a value of voltage fluctuation obtained by subtracting a pre-change potential of the signal line 12A from a post-change potential of the signal line 12A; and ΔVsB is a value of voltage fluctuation obtained by subtracting a pre-change potential of the adjacent signal line 12B from a post-change potential of the adjacent signal line 12B.

As described above, the liquid crystal display devices 20 and 21 are driven by the dot inversion driving. Therefore, if the polarity of a signal flowing on the signal line 12A is positive, the polarity of a signal flowing on the signal line 12B is negative. As a result, the influences on the drain potential are opposite, and cancel out each other.

In the pixel A, the signal lines 12A and 12B are distanced from each other, and provided between both edges of the pixel electrode 5A, the both edges being parallel to the signal lines 12. With this arrangement, as shown in FIGS. 5(b) and 6(b), the area of the superimposed portions does not change, even if the pixel electrode is shifted with respect to the signal lines. Therefore, even if the pixel electrode is shifted with respect to the signal lines, the capacitances CsdA and CsdB will not be influenced significantly.

Next, with reference to FIGS. 7(a) and 7(b), and FIGS. 8(a) and 8(b) (cross-sectional views of FIG. 7(a) and 7(b)), the capacitances Csd provided in the pixel B, on which signal lines 12 are not provided, is described (the following description is also applicable to the pixel D).

In the pixel B, the signal lines 12 are not provided. Therefore, there is no overlap between the signal lines 12 and the pixel electrode 5B. However, as shown in FIGS. 7(a) and 8(a), due to the influence of an electric field in an oblique direction, a capacitance CsdB' is provided between the signal line 12B and the pixel electrode 5B. Likewise, due to the influence of an electric field in an oblique direction, a capacitance CsdC' is provided between the signal line 12C and the pixel electrode 5B. The signal line 12C is provided in the pixel C, which is the adjacent pixel on the opposite side of the pixel A. The signal line 12C supplies a signal to the pixel C. The capacitances CsdB' and CsdC' are small, i.e. respectively not higher than one-quarter of the capacitances CsdA and CsdB, which are formed in the pixel A. In addition, the polarity of a signal flowing on the signal line 12B and the polarity of a signal flowing on the signal line 12A are opposite. Therefore, the influences on the drain potential of the pixel B cancel out each other.

As shown in FIGS. 7(b) and 8(b), because the pixel electrode 5B is distanced from the signal lines 12B and 12C, the capacitances CsdB' and CsdC' will not change significantly, even if the pixel electrode 5 is shifted with respect to the signal lines 12.

If the TFT substrate 1 is arranged as described above, and used in a liquid crystal device driven by the dot inversion driving, the fluctuation of the drain potential that occurs through the capacitance CsdA (which is formed at one superimposed portion) and the fluctuation of the drain potential that occurs through the capacitor CsdB (which is formed at the other superimposed portion) are opposite in the pixel A (in which two signal lines are provided) during an OFF-period of the thin-film transistor. Thus, like the ladder structure, the foregoing arrangement improves display quality, because the fluctuation of the drain potential caused by the capacitors Csd (CsdA and CsdB) is small.

The two signal lines 12 are provided between the edges of the pixel electrode 5, the edges being parallel to the signal lines. With this arrangement, the area of the superimposed portions of the signal lines 12 and the pixel electrode 5 will not change, even if the pixel electrode 5 is shifted with respect to the signal lines 12. Therefore, no significant change occurs in the capacitances provided at those parts where the two signal lines 12 are provided. Thus, like the ladder structure, the foregoing arrangement makes it possible to set a wide process margin.

On the other hand, in the pixel B, in which no signal line is provided, the capacitances (CsdB' and CsdC') are respectively provided by the oblique electric fields between the pixel electrode 5 and the signal line 12 in the pixel A, and between the pixel electrode 5 and the signal line 12 in the pixel C. However, the polarity of the signal supplied to the signal line 12 in the pixel A and the polarity of the signal supplied to the signal line 12 in the pixel C are opposite. Therefore, the influences on the drain potential exerted through the capacitances cancel out each other.

Even if the pixel electrode 5 is shifted with respect to the signal lines 12, the influence of the shift on the capacitances, which are respectively formed by the oblique electric fields, is too small to be a problem, because the pixel electrode 5 is distanced from the signal lines 12.

The foregoing arrangement is simpler than the conventional ladder structure, because the signal lines 12 of each pixel are not divided. In addition, the foregoing arrangement reduces the area occupied by the signal lines 12 with respect to the area of apertures. Therefore, the aperture ratio of the panel as a whole is improved.

Especially according to the foregoing arrangement, as shown in FIG. 1(a), the pixel on which the signal lines 12 are provided and the pixel on which no signal line is provided are arrayed alternately. Therefore, the capacitances provided by the oblique electric fields between the pixel electrode 5 and the signal lines 12 in the adjacent pixels can be canceled out effectively. In a pixel in which the signal lines 12 are not provided, the capacitances (CsdB' and CsdC') are provided by the oblique electric fields between (i) the pixel electrode of that pixel and (ii) the signal lines 12 respectively provided on the pixel electrodes 5 of adjacent pixels. By alternately arraying a pixel on which the signal lines 12 are provided and a pixel on which the signal lines 12 are not provided, it is possible to equalize values of the capacitances provided by the oblique electric fields at both sides of the pixel electrode on which the signal lines 12 are not provided. As a result, display quality is further improved.

In addition, with the foregoing arrangement, the directions of outgoing lines from the TFTs 13 to the contact holes 17 can be unified. That is, the directions of the TFTs 13 can be unified. Therefore, it is possible to minimize the influence of shift on the display quality at active element portions.

Figure 9:
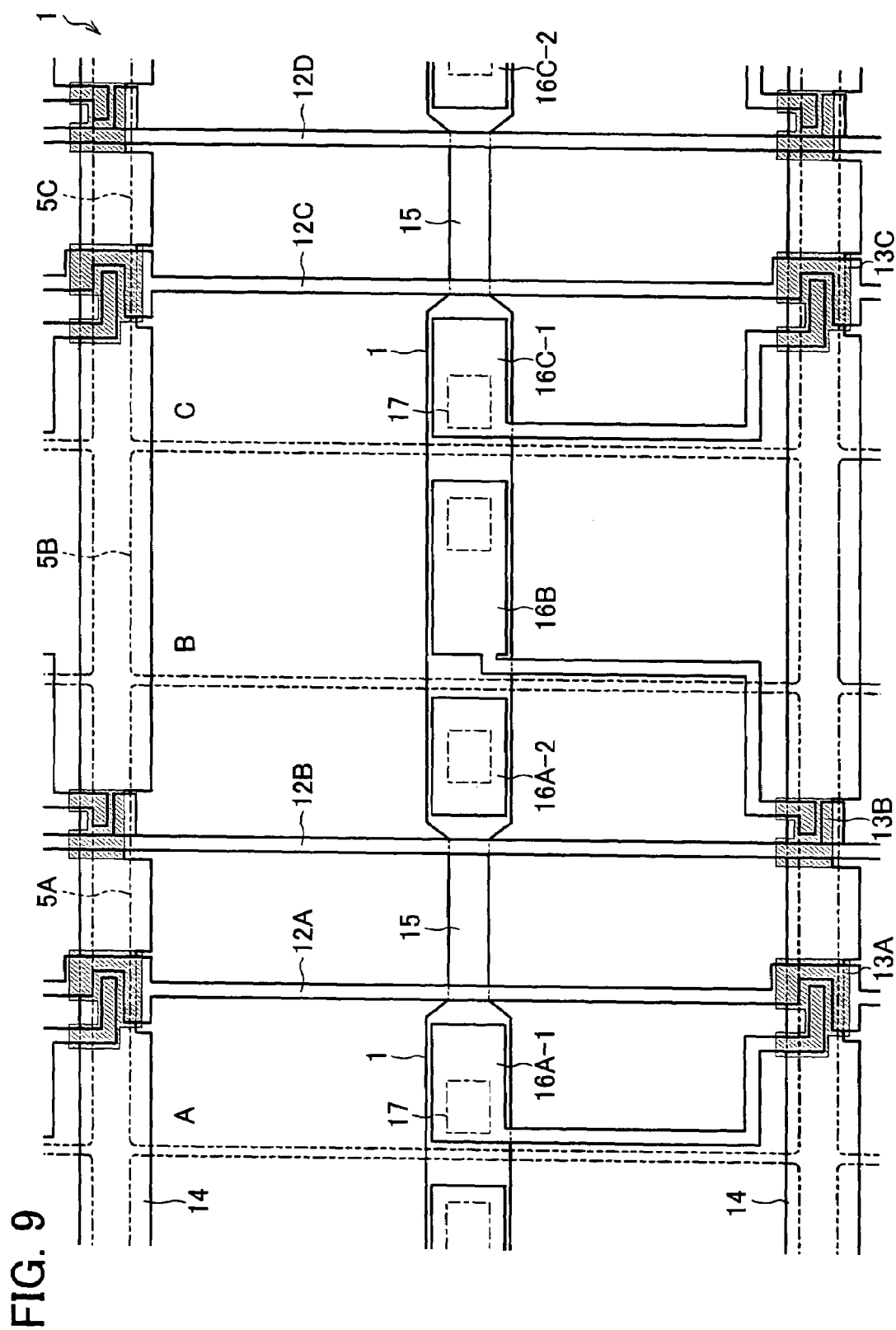
FIG. 9 is a plan view schematically illustrating a structure of a TFT substrate of a second embodiment of the present invention.

FIG. 9 is a plan view illustrating a TFT substrate 1 of a second embodiment of the present invention. For the purpose of explanation, members whose functions are identical to those of the members described in the first embodiment are labeled with identical reference numerals, and explanations for such members are omitted.

On the TFT substrate 1 of the present embodiment, two signal lines are provided in the middle of a pixel on which two signal lines are provided. That is, in a pixel A, a signal line 12A and a signal line 12B are provided in the middle. On the TFT substrate 1 of FIG. 4, the Cs electrode 16, which provides the storage capacitance, is provided between the signal line 12A and the signal line 12B. On the other hand, on the TFT substrate 1 of the present embodiment, Cs electrodes 16A-1 and 16A-2 are respectively provided at two positions: one is between the signal line 12A and one edge of the pixel electrode 5A, and the other is between the signal line 12B and the other edge of the pixel electrode 5A.

By thus providing the signal lines 12A and 12B in the middle of the pixel A, the aperture ratio of the liquid crystal device 20 or 21 as a whole is lower than that of the liquid crystal device 20 or 21 using the TFT substrate 1 of FIG. 4. However, because the distance between the signal line 12B and the pixel electrode 5B and the distance between the signal line 12C and the pixel electrode 5B are longer, the values of the capacitances CsdB' and CsdC' (which are provided by the oblique electric fields between the pixel electrode 5B and the signal line 12B, and between the pixel electrode 5B and the signal line 12C, respectively) are reduced to approximately one-tenth of the values in the structure of FIG. 4.

According to the TFT substrate 1 of the present embodiment, in the direction parallel to the scanning lines 14, the pixel electrode 5 is larger in the pixels A and C (on which the signal lines 12 are not provided) than in the pixels B and D (on which the signal lines 12 are provided intensively). This arrangement is adopted in order to equalize the aperture area of each pixel.

Figure 10:
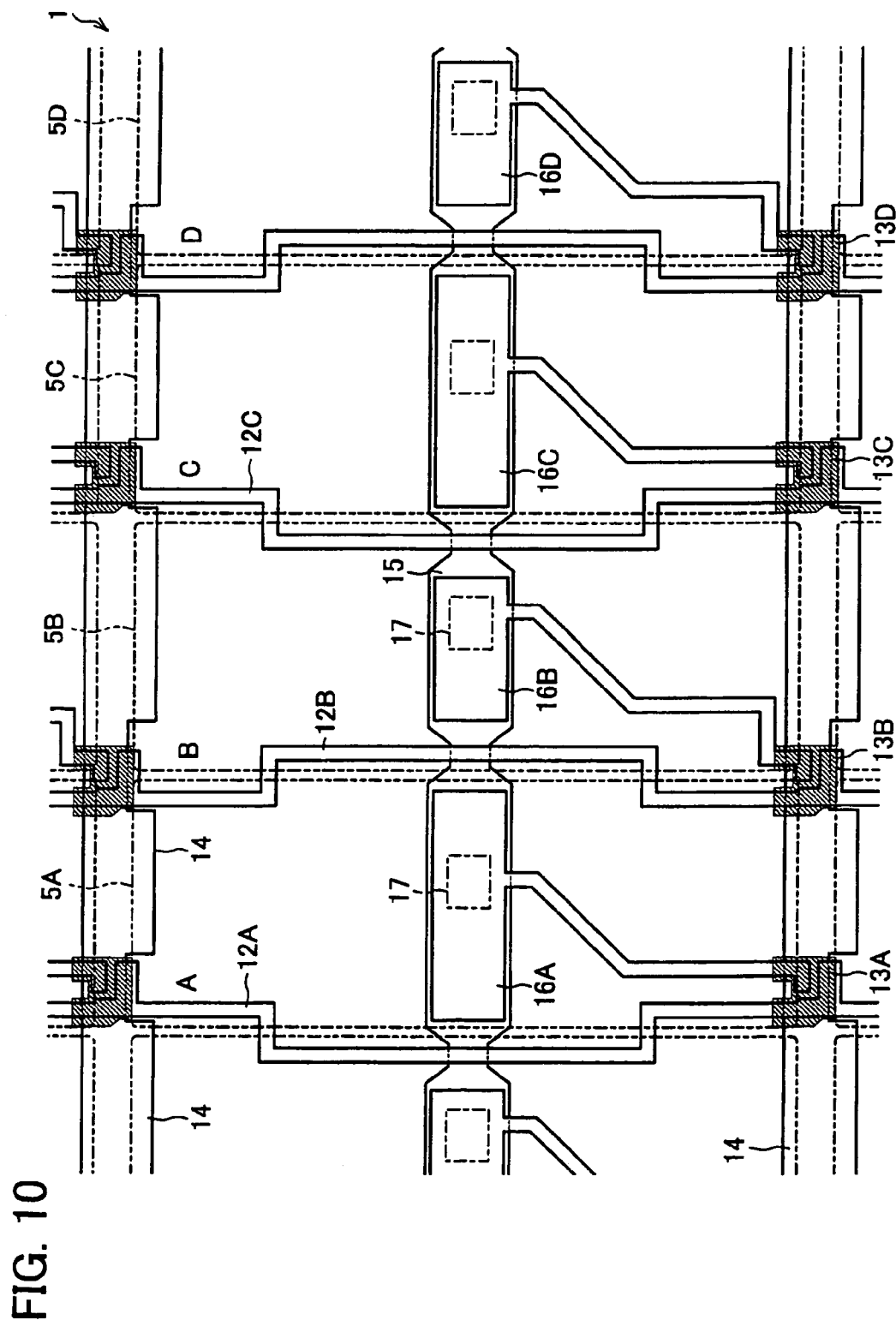
FIG. 10 is a plan view schematically illustrating a structure of a TFT substrate of a third embodiment of the present invention.

FIG. 10 is a plan view illustrating a TFT substrate 1 of a third embodiment of the present invention. For the purpose of explanation, members whose functions are identical to those of the members described in the first embodiment or the second embodiment are labeled with identical reference numerals, and explanations for such members are omitted.

According to the TFT substrate 1 of the present embodiment, the signal line 12B, which charges the pixel B, has two portions. One is provided on the corresponding pixel electrode 5B. The other is a roundabout portion provided on the pixel electrode 5A, which is adjacent to the pixel electrode 5B in the direction parallel to the scanning lines 14. Likewise, the signal line 12C, which charges the pixel C, has two portions. One is provided on the corresponding pixel electrode 5C. The other is a roundabout portion provided on the pixel electrode 5B, which is adjacent to the pixel electrode 5C in the direction parallel to the scanning lines 14. The signal lines 12a and 12D, which respectively correspond to the pixels A and D, are arranged in the like manner. On each pixel electrode 5, a portion of the corresponding signal line 12 and a roundabout portion of the signal line 12 of the adjacent pixel electrode 5 are provided as a pair. Here, attention is focused on the pixel B. On the pixel electrode 5B, a portion of the signal line 12B and a roundabout portion of the signal line 12C, which corresponds to the adjacent pixel C, are provided as a pair. Likewise, attention is focused on the pixel C. On the pixel electrode 5C, a portion of the signal line 12C and a roundabout portion of the signal line 12D, which corresponds to the adjacent pixel D, are provided as a pair. Except those portions that lie between pixel electrodes 5, the signal lines 12 are provided between the edges of the pixel electrode 5 that is superimposed on the signal lines 12.

According to this arrangement, a pixel electrode 5 has a portion on which two signal lines 12 (including a signal line corresponding to an adjacent pixel) are provided, and a portion on which the signal lines 12 are not provided at all. Here again, except those portions that lie between pixel electrodes 5, the signal lines 12 are provided between the edges of the pixel electrode 5. Therefore, even if the pixel electrode 5 is shifted with respect to the signal lines 12, the superimposed area of the signal lines 12 and the pixel electrode 5 will not change. If a shift occurs, the shift changes the capacitances Csd at those portions of the signal lines 12 that lie between pixel electrodes. However, because most portions of the signal lines 12 are covered with the pixel electrodes 5, the change is too small to be a problem.

Therefore, as in the cases of the TFT substrate 1 of the first embodiment (see FIG. 4) and the second embodiment (see FIG. 9), if the TFT substrate 1 of the present embodiment is used in a liquid crystal display device that is driven by the dot inversion driving, the liquid crystal device can reduce the drain potential fluctuation at each pixel (the drain potential fluctuation occurs during an OFF-period of the thin-film transistor through the capacitances CsdA and CsdB, which are respectively provided at the superimposed portions). As a result, display quality is improved.

Moreover, the foregoing arrangement is simpler than the conventional ladder structure, because the signal lines 12 of each pixel are not divided. In addition, the aperture ratio of the panel as a whole is improved, because the area occupied by the signal lines 12 with respect to the area of apertures is reduced.

The structure of the TFT substrate 1 of the present embodiment is advantageous also in that the signal lines 12 are allocated to each pixel evenly in terms of the area occupied by the signal lines 12. Again, if the area occupied by the signal lines 12 is different from pixel to pixel, the aperture area can be equalized by adopting the following arrangement: in the direction parallel to the scanning lines, a pixel electrode 5 in which a large area is occupied by the roundabout portion of a signal line 12 has a larger size than a pixel electrode in which a small area is occupied by the roundabout portion of a signal line 12. As a result, an excellent white balance is be attained.

Although not shown in FIGS. 4, 9, and 10, each TFT substrate 1 has a light-shielding pattern section that covers (i) gaps between pixel electrodes 5 and (ii) the TFTs 13. The light-shielding pattern section prevents light from causing malfunction of the thin-film transistors, and ensures that no light is transmitted through the gaps.

Next, a fourth embodiment of the present invention is described. For the purpose of explanation, members whose functions are identical to those of the members described in the first to third embodiments are labeled with identical reference numerals, and explanations for such members are omitted.

In the first embodiment, as shown in the TFT substrate 1 of FIG. 4, the size of the pixel electrode 5 in the direction parallel to the scanning lines 14 is larger in the pixels A and C (in which the signal lines 12 are provided intensively) than in the pixels B and D (in which the signal lines 12 are not provided). This arrangement is adopted so as to equalize the aperture area of the pixel A and the aperture area of the pixel B.

In the present embodiment, the foregoing arrangement is modified so that the aperture area of the pixels B and D (in which the signal lines 12 are not provided) is one-half of the aperture area of the pixels A and C (in which the signal lines 12 are provided intensively). In other words, the TFT substrate 1 of the present embodiment is arranged so that a pixel electrode corresponding to a pixel in which the signal line 12 are not provided has a smaller size in the direction parallel to the scanning lines 14 than a pixel electrode corresponding to a pixel in which the signal lines 12 are provided intensively. This arrangement is adopted so that the aperture area of the pixel in which the signal lines 12 are not provided is one-half of the aperture area of the pixel in which the signal lines 12 are provided intensively.

Figure 11:
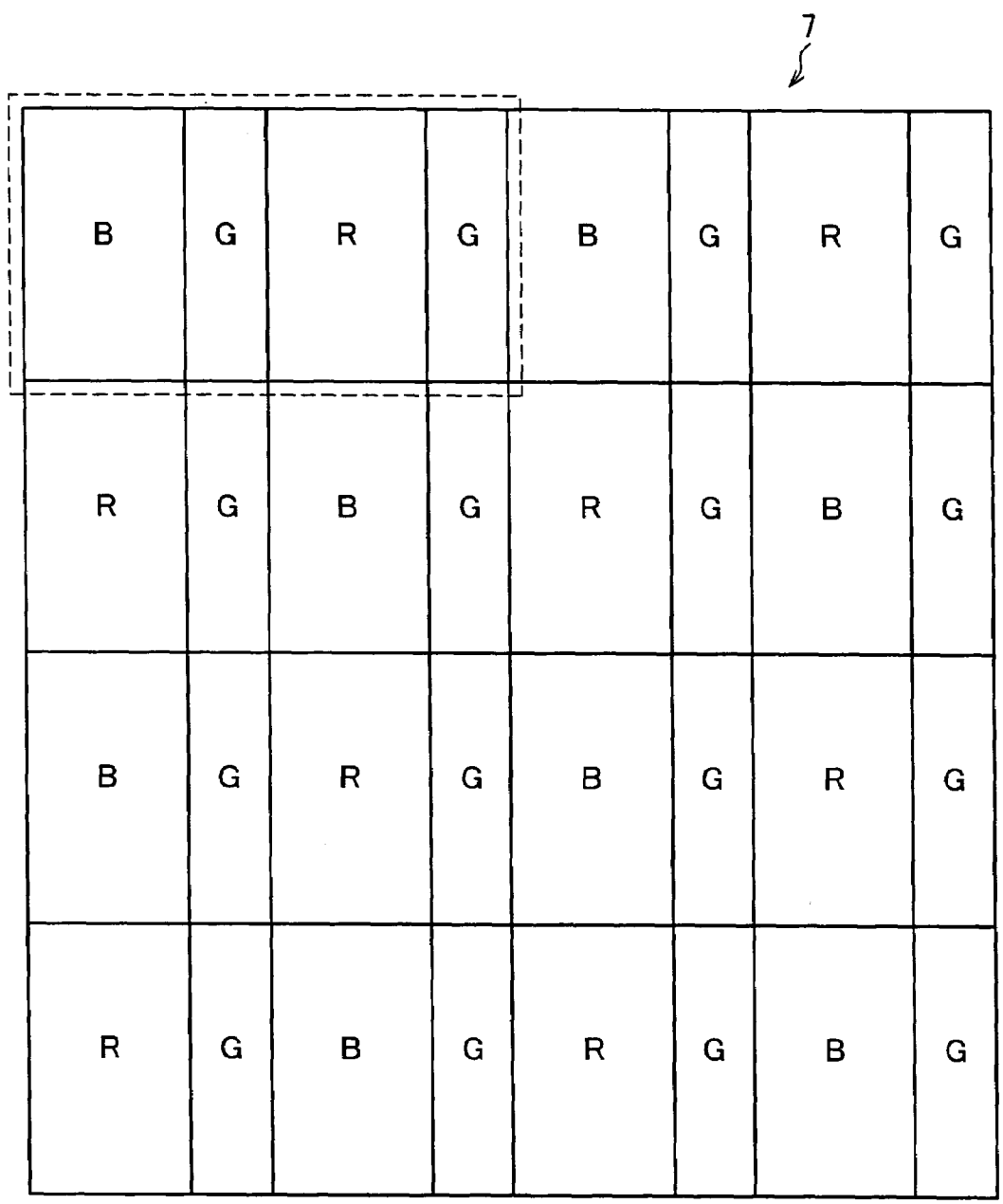
FIG. 11 is a diagram illustrating a color arrangement of a color filer provided to a liquid crystal display device using a TFT substrate of a fourth embodiment of the present invention.
Figure 12:
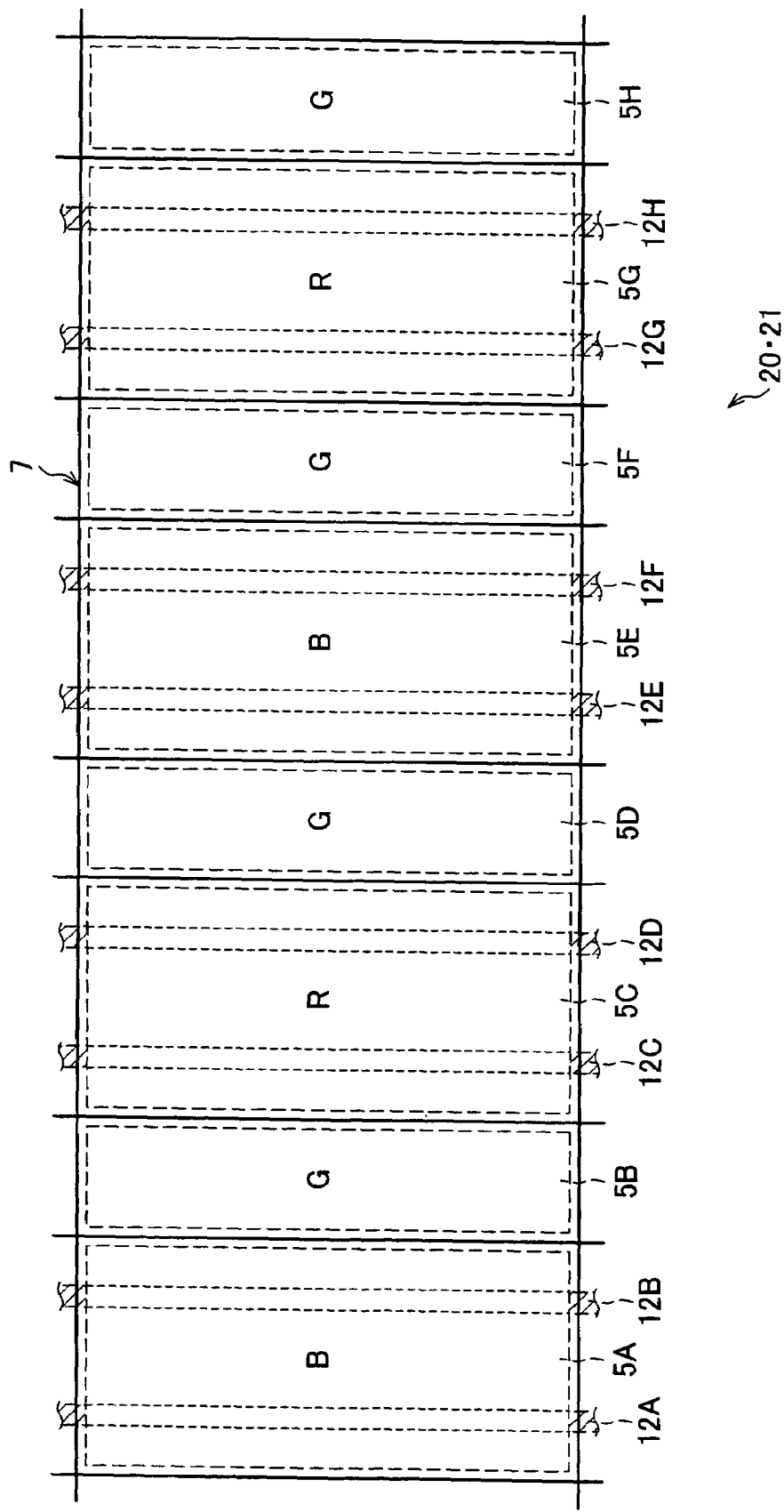
FIG. 12 is a schematic plan view of a liquid crystal display device including the TFT substrate of the fourth embodiment of the present invention and the color filter of FIG. 11.
Figure 14:
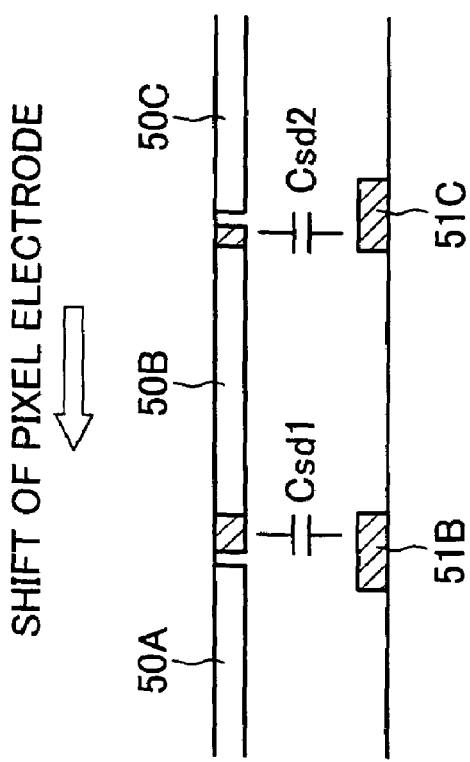
FIGS. 14(a) and 14(b) are explanatory diagrams illustrating capacitances Csd provided in a pixel, in the liquid crystal display device using the conventional TFT substrate.
Figure 14:
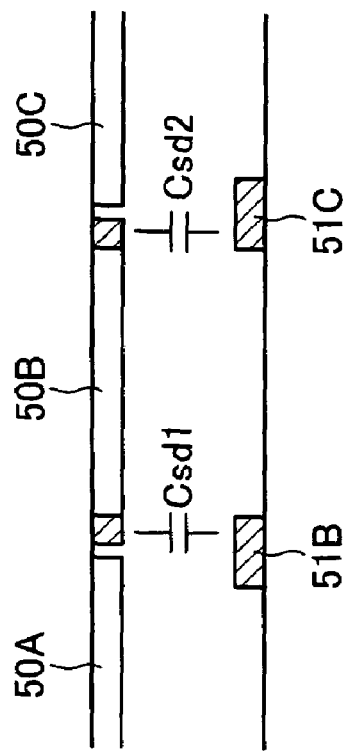
Figure 15:
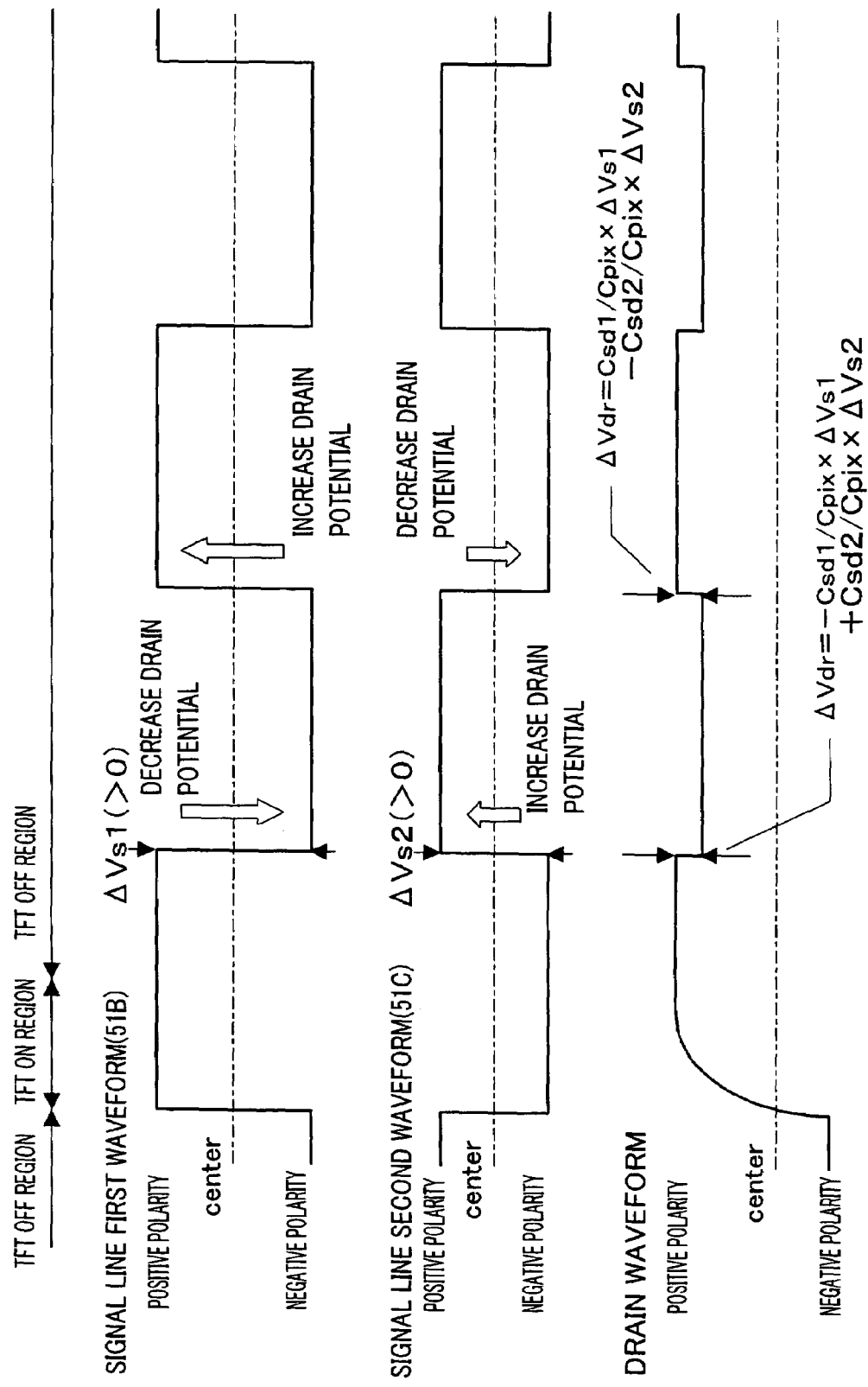
FIG. 15 is an explanatory diagram schematically illustrating fluctuations of a drain potential, the fluctuations being caused by a signal flowing on a signal line.
Figure 16:
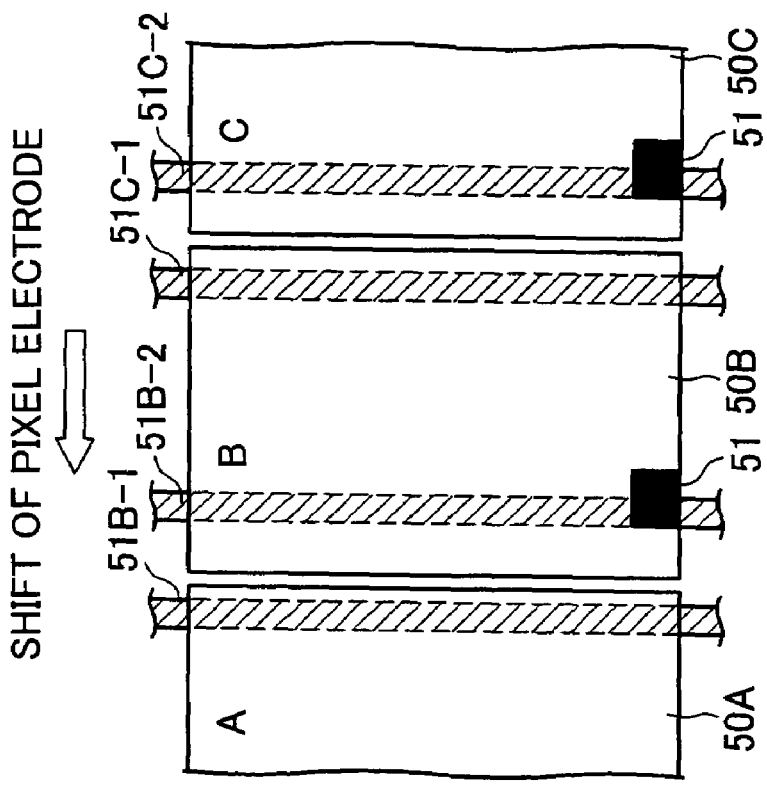
FIGS. 16(a) and 16(b) are explanatory diagrams illustrating capacitances Csd provided in pixels, in a liquid crystal display device using another conventional TFT substrate (ladder structure).
Figure 16:
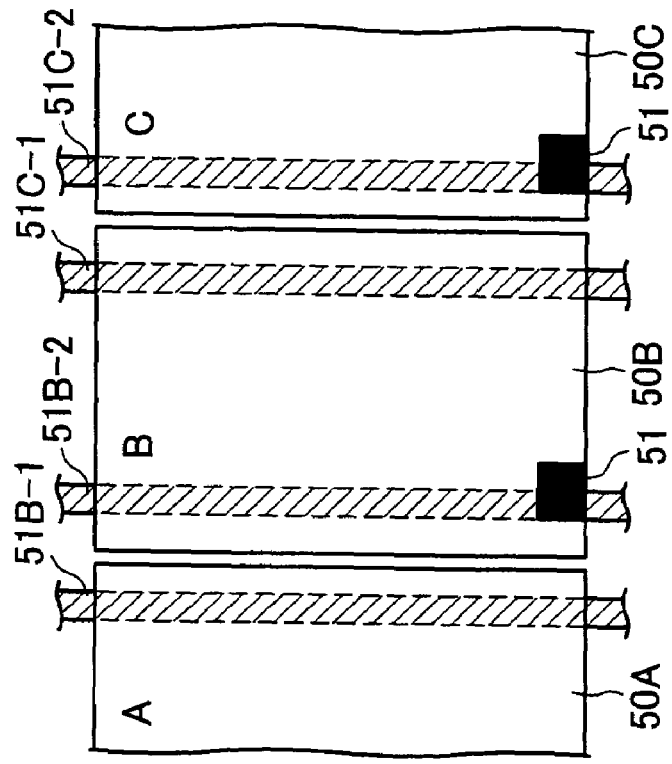
Figure 17:
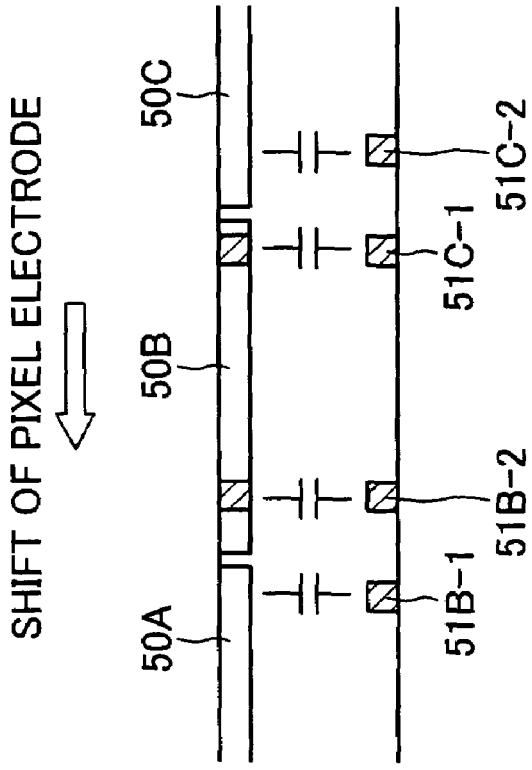
FIGS. 17(a) and 17(b) are explanatory diagrams illustrating capacitances Csd provided in pixels, in the liquid crystal display device using another conventional TFT substrate (ladder structure).
Figure 17:
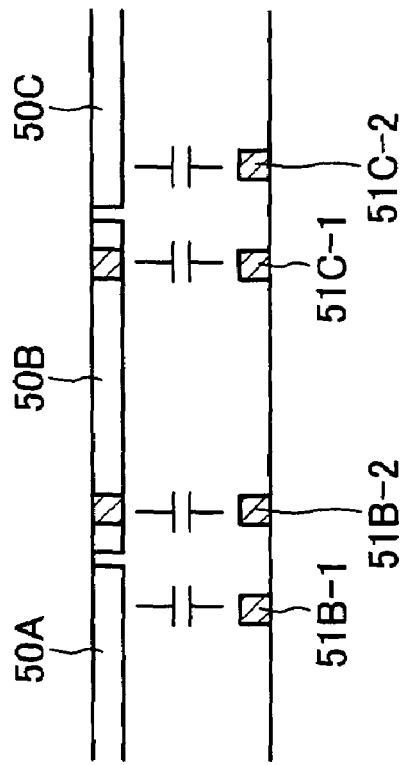
Figure 18:
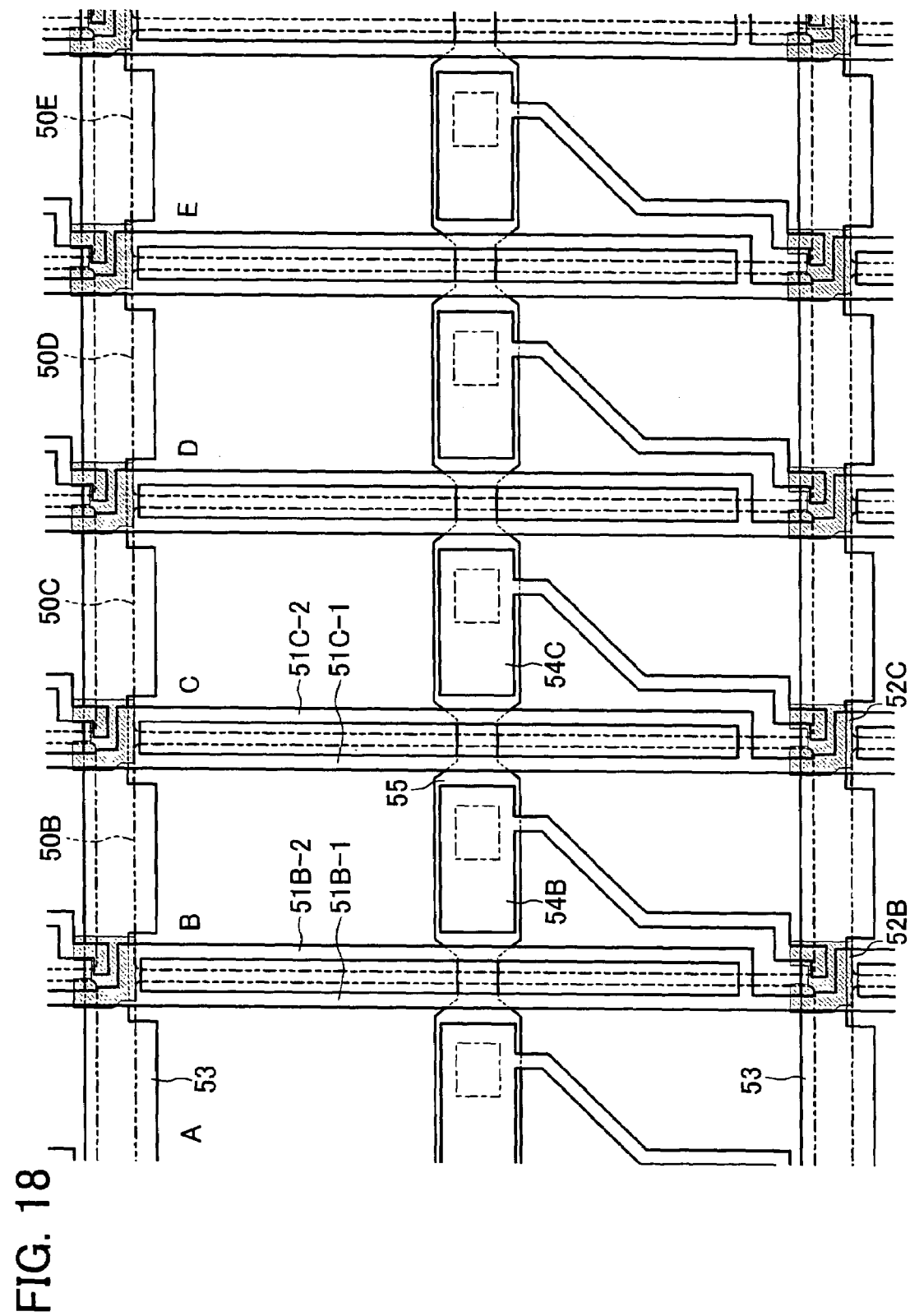
FIG. 18 is a plan view schematically illustrating a structure of a TFT substrate in which the conventional ladder structure is adopted.

With this arrangement, the TFT substrate 1 of the present embodiment can be used suitably in a liquid crystal 20 or 21 including a color filter 7 shown in FIG. 11. With reference to FIGS. 11 and 12, the following specifically describes the present embodiment.

FIG. 11 is a schematic diagram illustrating a color arrangement of the color filter 7.

The color filter 7 includes a plurality of filters of three primary colors: red (R), green (G), and blue (B). In the color filter 7, filters of B (first), G (second), R (third), and G (fourth) constitute one color filter unit, and a plurality of such blocks are arrayed.

For example, in the direction parallel to the signal lines 12 shown in FIG. 4, the color filter 7 includes columns in which G-filters are arrayed successively, and columns in which a B-filter and an R-filter are arrayed alternately.

The color filter described in the present embodiment is arranged so that the second and fourth filters in each block are G-filters. However, the present invention is not limited to this arrangement. If the pixel electrodes corresponding to the first and third filters have half the size of the pixel electrodes corresponding to the second and fourth filters, the first and the third filters may be G-filters.

The area of a G-filter is one-half of the area of an R-filter or a B-filter. Therefore, in the color filter 7, each color has the same total area.

Described next is a case in which the TFT substrate is used in a liquid crystal display device 20 or 21 including the color filter 7 having the foregoing color arrangement.

FIG. 12 is a schematic plan view illustrating a liquid crystal display device including the TFT substrate and the color filter 7. For the purpose of explanation, only the color filter 7, the pixel electrodes 5 of the TFT substrate, and the signal lines 12 of the TFT substrate are shown in FIG. 12.

As shown in FIG. 12, the filters of B, G, and R respectively correspond to the pixel electrodes 5 provided on the TFT substrate 1, and respectively form a B-pixel, a G-pixel, and an R-pixel.

Specifically, as shown in FIG. 12, the signal lines 12 are not provided on the pixel electrodes 5B, 5D, 5F, and 5H, which are respectively opposed to G-filters. The signal lines 12A and 12B are provided intensively on the pixel electrode 5C, which is opposed to a B-filter. The signal lines 12C and 12D are provided intensively on the pixel electrode 5C, which is opposed to an R-filter. The signal lines 12E and 12F are provided intensively on the pixel electrode 5E, which is opposed to an e-filter. The signal lines 12G and 12H are provided intensively on the pixel electrode 5G, which is opposed to an R-filter.

As described above, in the TFT substrate of the present embodiment, a pixel electrode corresponding to a pixel on which the signal lines 12 are not provided has a smaller size in the direction parallel to the scanning lines 14 than a pixel electrode corresponding to a pixel on which the signal lines 12 are provided intensively. This arrangement is adopted so that the aperture area of the pixel on which the signal lines 12 are not provided is one-half of the aperture area of the pixel on which the signal lines 12 are provided intensively. Therefore, in FIG. 12, the pixel electrodes 5B, 5D, 5F, and 5H, which respectively correspond to G-pixels (pixels on which the signal line 12 are not provided) have a smaller size in the direction parallel to the scanning lines 14 than the pixel electrodes 5A, 5C, 5E, and 5G, which respectively correspond to R-pixels or B-pixels (pixels on which the signal lines 12 are provided intensively).

With this arrangement, the aperture area in each G-pixel is one-half of the aperture area of an R-pixel or a B-pixel.

Therefore, because the liquid crystal display device of the present embodiment includes the color filter 7 having the foregoing color arrangement, the number of green (G) pixels, which have a high level of visibility for human, is twice the number of red pixels and blue pixels. Therefore, higher resolution can be attained as compared with a liquid crystal display device in which the same number of pixels are provided for each color (see, for example, Japanese Publication for Patent Application, Tokukouhei 03-36239 (publication date: May 30, 1991; corresponding to U.S. Pat. No. 4,642,619)).

In the liquid crystal display device of the present embodiment, although the number of G-pixels are twice the number of R-pixels or B-pixels, the aperture area of a G-pixel is one-half of the aperture area of an R-pixel or a B-pixel. Therefore, the total aperture area is the same among the pixels of B, G, and R. As a result, an excellent white balance is attained.

By using the TFT substrate of the foregoing arrangement, the structure of the G-pixels, which are fine, is simplified, because the signal lines 12 are not provided on a G-pixel, whose aperture area is one-half of the aperture area of an R-pixel or a B-pixel. Therefore, it is possible to prevent the decrease of yield from occurring due to microfabrication and high-density packaging of wires.

As described above, the present invention is suitable not only for a color filter having an odd-number cycle (in which R, G, and B constitute one block), but also for a color filter having an even-number cycle (in which filters of the same color are used in one color unit, e.g. RGBG).

In the present embodiment, the liquid crystal display device includes a TFT substrate in which the signal lines 12 are arranged in the same manner as the signal lines 12 on the TFT substrate 1 of the first embodiment. However, the color filter 7 can be used together with a TFT substrate in which the signal lines 12 are arranged in the same manner as the signal lines 12 on the TFT substrate 1 of the second embodiment see FIG. 9), provided that the ratio between the aperture area of a pixel on which the signal lines 12 are not provided and the aperture area of a pixel on which the signal lines 12 are provided intensively is 1:2. This condition can be satisfied by designing the pixel electrodes so that the pixel electrode corresponding to the pixel on which the signal lines 12 are not provided has a smaller size in the direction parallel to the scanning lines 14 than the pixel electrode corresponding to the pixel on which the signal lines 12 are provided integrally.

To attain the foregoing object, a first active element substrate of the present invention includes a plurality of signal lines; a plurality of scanning lines intersecting the signal lines; an active element provided at each intersection between the signal lines and the scanning lines; and a pixel electrode provided at each intersection between the signal lines and the scanning lines, the pixel electrode being superimposed at least on the signal lines, wherein: signal lines respectively corresponding to a pair of pixel electrodes are provided intensively on one of the pair of pixel electrodes so as to be located between edges of said one of the pair of pixel electrodes, the pair of pixel electrodes being adjacent to each other in a direction parallel to the scanning lines. Therefore, there is an effect that it is possible to provide an active element substrate that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

According to this arrangement, the signal lines respectively corresponding to the pair of pixel electrodes are provided only on one of the pair of pixel electrodes. Therefore, on a pixel electrode, two signal lines (including a signal line corresponding to an adjacent pixel electrode) are provided, or no signal line is provided at all.

If such an active element substrate is used in the liquid crystal display device that is driven by the dot inversion driving, in a pixel of a pixel electrode on which two signal lines are provided, fluctuations of the drain (an example of the terminal connected to the pixel electrode) potential occurs in opposite directions, the fluctuation occurring during an OFF-period of a thin-film transistor (an example of an active element) through the capacitances Csd1 and Csd2 respectively provided at superimposed portions. Therefore, as in the ladder structure described above, it is possible to reduce the fluctuation of the drain potential caused by the capacitances Csd (Csd1 and Csd2), thereby improving display quality.

In addition, the two signal lines provided on a pixel electrode are located between edges of the pixel electrode, the edges being parallel to the signal lines. Therefore, even if the pixel electrode is shifted with respect to the signal lines, the area of the superimposed portions of the signal lines and the pixel electrode does not change. As a result, no significant change occurs in the capacitances provided at the positions where the two signal lines are respectively provided. This makes it possible to set a wide process margin.

On the other hand, in a pixel in which no signal line is provided on a pixel electrode, if signal lines are provided in adjacent pixels, capacitances are respectively provided by oblique electric fields between the signal lines and the pixel electrode. However, the two signal lines that respectively provide the capacitances by means of the oblique electric fields are supplied with signals of opposite polarities, respectively. Therefore, the influences exerted through the capacitances on the drain potential cancel out each other.

Even if the pixel electrode is shifted with respect to the signal lines, the influence of the shift on the capacitances respectively provided by the oblique electric fields are too small to be a problem. This is because the pixel electrode and the signal lines are distanced (not superimposed).

Such an arrangement is simpler than the conventional ladder structure, because the signal lines of each pixel are not divided. In addition, the aperture ratio of the panel as a whole is improved, because the area occupied by the signal lines with respect to the area of apertures is reduced. This is particularly suitable for a high-definition liquid crystal display device having a short pixel pitch.

Note that a signal line corresponding to a pixel electrode means a signal line that charges a pixel including the pixel electrode. From the side of the signal line, the pixel electrode charged by the signal line can be expressed as a corresponding signal electrode. Also note that, although such expressions as "signal lines are provided on a pixel electrode" is used in order to describe the superimposition of the signal lines and pixel electrode, this does not mean a hierarchical relationship on the substrate among the signal lines, scanning lines, and pixel electrodes. To provide easy-to-understand explanation, TFTs are used as an example of active elements, and effects of the present invention are described using the phenomena caused in the case of TFTs.

To attain the foregoing object, in the first active element substrate of the present invention, a pixel electrode on which signal lines are provided and a pixel electrode on which no signal line is provided are arrayed alternately in the direction parallel to the scanning lines. Therefore, as compared with an arrangement in which these pixel electrodes are not arrayed alternately, it is possible to more effectively cancel out the capacitances respectively provided by the oblique electric fields between (i) a pixel electrode and (ii) signal lines in the adjacent pixels.

In a pixel of a pixel electrode on which no signal line is provided, capacitances are respectively provided between (i) the pixel electrode and (ii) signal lines provided on pixel electrodes of adjacent pixels. By alternately arraying, as described above, the pixel electrode on which signal lines are provided and the pixel electrode on which no signal line is provided, it is possible to equalize the values of the capacitances provided at both sides of the pixel electrode on which no signal line is provided. Therefore, the capacitances can be canceled out effectively. As a result, because the capacitances respectively provided by the oblique electric fields between (i) a pixel electrode and (ii) signal lines in the adjacent pixels can be canceled out more effectively as compared with an arrangement in which these pixel electrodes are not arrayed alternately, there is an effect that display quality is further improved.

In addition, with the foregoing arrangement, the directions of outgoing lines from active elements to contact holes (for respectively connecting the active elements with pixel electrodes) can be unified. That is, the directions of the active elements can be unified. Therefore, there is also an effect that it is possible to minimize the influence of shift on the display quality at active element portions.

To attain the foregoing object, a second active element substrate of the present invention includes a plurality of signal lines; a plurality of scanning lines intersecting the signal lines; an active element provided at each intersection between the signal lines and the scanning lines; and a pixel electrode provided at each intersection between the signal lines and the scanning lines, the pixel electrode being superimposed at least on the signal lines, wherein: each of the signal lines includes a portion provided on a corresponding pixel electrode and a roundabout portion provided on a pixel electrode that is adjacent, in a direction parallel to the scanning lines, to said corresponding pixel electrode; and, on each pixel electrode, a portion of a corresponding signal line and a roundabout portion of a signal line corresponding to an adjacent pixel electrode form a pair, and the pair is located between edges of the pixel electrode except those portions that lie between pixel electrodes. Therefore, there is an effect that it is possible to provide an active element substrate that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

According to the foregoing arrangement, each signal line includes a roundabout portion, and, on each pixel electrode, a part of a corresponding signal line and a roundabout part of an adjacent signal line are provided as a pair. Therefore, in this case, each pixel electrode includes a portion on which two signal lines are provided (including a signal line corresponding to an adjacent pixel electrode) and a portion on which no signal line is provided at all. Moreover, the two signal lines are located between edges of the pixel electrode, except those portions that lie between pixel electrodes. Therefore, the superimposed area of the signal lines and the pixel electrode does not change, even if the pixel electrode is shifted with respect to the signal lines. As a result, it is possible to reduce the change of values of capacitances provided where partial signal lines are provided as a pair.

Like the first active element substrate described above, if such an active element substrate is used, for example, in the liquid crystal display device that is driven by the dot inversion driving, fluctuations of the drain (an example of the terminal connected to the pixel electrode) potential occurring in each pixel during an OFF-period of a thin-film transistor (an example of an active element) through the capacitances Csd1 and Csd2 respectively provided at superimposed portions can be reduced as in the ladder structure described above, while ensuring a wide process margin. Therefore, display quality is improved. Moreover, the arrangement is simpler as compared with the conventional ladder structure, because the signal lines of each pixel are not divided. In addition, the area occupied by the signal lines with respect to aperture portions is reduced. As a result, the aperture ratio of the panel as a whole is improved. In particular, the forgoing arrangement is advantageous in that the signal lines are allocated to each pixel evenly in terms of the area occupied by the signal lines.

To attain the foregoing object, in the first active element substrate and the second active element substrate, a pixel electrode on which signal lines are provided intensively or a pixel electrode on which a large area is occupied by a roundabout portion of a signal line has a larger size in the direction parallel to the scanning lines than a pixel electrode on which no signal line is provided or a pixel electrode on which a small area is occupied by a roundabout portion of a signal line. Therefore, it is possible to equalize the aperture area of a pixel in which two signal lines are provided and a pixel in which no signal line is provided. If a roundabout part of a signal line is provided, it is possible to equalize the aperture area of pixels, and there is also an effect that an excellent white balance is attained.

In the first active element substrate, an aperture area of a pixel of a pixel electrode on which no signal line is provided is one-half of an aperture area of a pixel of a pixel electrode on which signal lines are provided intensively. Therefore, the active element substrate of the present invention can be applied suitably to a liquid crystal display device using a color filter in which filters of red, green, blue, and green (RGBG) constitute one block, for example.

A liquid crystal display device of the present invention includes: the active element substrate of the present invention; an opposed substrate on which a common electrode is provided; and a liquid crystal layer sandwiched between the active element substrate and the opposed substrate, a polarity of a voltage applied to one of two adjacent signal lines being opposite a polarity of a voltage applied to the other of the two adjacent signal lines. Therefore, as described above, there is an effect that it is possible to provide an active element substrate that can (i) reduce, while ensuring a wide process margin, the fluctuation of the potential of a terminal to be connected to a pixel electrode (the fluctuation of the potential occurs during OFF-period of an active element due to capacitances respectively provided by superimposing a pixel electrode on signal lines), (ii) simplify the arrangement of signal lines, and (iii) improve the aperture ratio.

A liquid crystal display device of the present invention includes: an active element substrate in which an aperture area of a pixel of a pixel electrode on which no signal line is provided is one-half of an aperture area of a pixel of a pixel electrode on which signal lines are provided intensively; an opposed substrate on which a common electrode is provided; a liquid crystal layer sandwiched between the active element substrate and the opposed substrate; and color filters of red, green, and blue, provided so that four adjacent pixel electrodes arrayed in the direction parallel to the scanning lines constitute one color unit, the four adjacent pixel electrodes consisting of two pixel electrodes on which signal lines are provided, and two pixel electrodes on which no signal line is provided, the two pixel electrodes on which no signal line is provided respectively corresponding to color filters of green, a polarity of a voltage applied to one of two adjacent signal lines being opposite a polarity of a voltage applied to the other of the two adjacent signal lines. According to this arrangement, the number of green pixels, which have a high level of visibility for human, is twice the number of red and blue pixels. Therefore, higher resolution can be attained as compared with a liquid crystal display device in which the same number of pixels are provided for each color. In addition, because a green filter is provided so as to be opposed to a pixel electrode on which no signal line is provided, the total aperture area is the same among the pixels of red, blue, and green, even if the number of green pixels is twice the number of red pixels and blue pixels. As a result, an excellent white balance is attained.

Moreover, the liquid crystal display device of the present invention further includes a light-shielding pattern section provided on the active element substrate or on the opposed substrate, the light-shielding pattern section preventing light from being transmitted through gaps between pixel electrodes or through the active element. Therefore, it is possible to prevent light from being transmitted through a thin-film gap portion. According to the conventional arrangement in which signal lines are provided so as to cover gaps between pixel electrodes, the signal lines themselves function as light-shielding patterns. Thin-film transistors (active elements) malfunction when subjected to light. Therefore, by thus providing the light-shielding pattern, there is an effect that the malfunction occurring due to light is prevented.

In the liquid crystal display device of the present invention, an operation mode is a TN mode or an MVA mode.

In other words, the present invention can be expressed as follows. Namely, it is not the case that, in a liquid crystal display device, a signal line is provided so as to be covered at the same time with a pixel electrode of a pixel and with a pixel electrode of an adjacent pixel. Instead, the signal line is covered completely with either one of the electrodes, except the case in which the signal line has a portion that lies between pixel electrodes.

In this case, the liquid crystal display device may be arranged so that a pixel in which two signal lines are provided and a pixel in which no signal line is provided are arrayed alternately.

In the liquid crystal display device, a signal line is, except in the case in which the signal line bridges pixels, arranged so as to be completely covered with either one of two pixels provided next to each other in the direction of the scanning lines. However, a signal line may be arranged so as to be provided not only on one of the two pixels, but also partially provided on the other of the two pixels.

The liquid crystal display device may be arranged so that a polarity of a voltage applied to one of two adjacent signal lines is opposite a polarity of a voltage applied to the other of the two adjacent signal lines; and a pixel pitch in the direction of the scanning lines varies from pixel to pixel.

The liquid crystal display device may be a TN-type liquid crystal display device including a liquid crystal layer aligned substantially horizontally with respect to substrate surfaces, and twisted substantially by 90 degrees between the upper and lower substrates, the liquid crystal layer including a liquid crystal material having a positive dielectric anisotropy. Alternatively, the liquid crystal display device may be an MVA-type liquid crystal display device, including a vertically aligned liquid crystal layer, the liquid crystal layer including a nematic liquid crystal material having a negative dielectric anisotropy.

In addition, the liquid crystal display device may further include a light-shielding pattern (BM) at gaps between pixel electrodes and at TFT parts, on the TFT substrate.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An active element substrate, comprising: a plurality of signal lines; a plurality of scanning lines intersecting the signal lines; an active element provided proximate each intersection between the signal lines and the scanning lines; and a pixel electrode provided proximate each intersection between the signal lines and the scanning lines, the pixel electrode being superimposed at least on the signal lines, wherein:
   each of the signal lines includes a portion provided on a corresponding pixel electrode and a roundabout portion provided on a pixel electrode that is adjacent, in a direction parallel to the scanning lines, to said corresponding pixel electrode; and
   on each pixel electrode, a portion of a corresponding signal line and a roundabout portion of a signal line corresponding to an adjacent pixel electrode form a pair in a scanning-line extending direction, a first portion of the pixel electrode being provided so as to overlap both the corresponding signal line and the signal line corresponding to the adjacent pixel electrode, and a second portion of the pixel electrode being provided so as to not overlap each of the corresponding signal line and the signal line corresponding to the adjacent pixel electrode, the first and second portions of the pixel electrode being provided in parallel with the signal line so as to be substantially adjacent to each other, and the pair of the signal lines is located completely between edges of pixel electrodes except those portions that lie between pixel electrodes.

2. The active element substrate as set forth in claim 1, wherein: a pixel electrode on which a large area is occupied by a roundabout portion of a signal line has a larger size in the direction parallel to the scanning lines than a pixel electrode on which a small area is occupied by a roundabout portion of a signal line.

3. The substrate of claim 1, wherein: in the first portion of the pixel electrode the pixel electrode overlaps both the corresponding signal line and the roundabout portion of a non-corresponding signal line, and in the second portion of said pixel electrode the pixel electrode does not overlap either of the corresponding signal line or the non-corresponding signal line, wherein the first and second portions of the pixel electrode are parallel to each other as viewed from above.

4. A liquid crystal display device, comprising:
   an active element substrate including a plurality of signal lines, a plurality of scanning lines intersecting the signal lines, an active element provided proximate each intersection between the signal lines and the scanning lines, and a pixel electrode provided proximate each intersection between the signal lines and the scanning lines, the pixel electrode being superimposed at least on the signal lines, wherein each of the signal lines includes a portion provided on a corresponding pixel electrode and a roundabout portion provided on a pixel electrode that is adjacent, in a direction parallel to the scanning lines, to said corresponding pixel electrode, and
   wherein, on at least one pixel electrode, a portion of a corresponding signal line and a roundabout portion of a signal line corresponding to an adjacent pixel electrode form a pair in a scanning-line extending direction, a first portion of the pixel electrode being provided so as to overlap both the corresponding signal line and the signal line corresponding to the adjacent pixel electrode, and a second portion of the pixel electrode being provided so as not to overlap either of the corresponding signal line or the signal line corresponding to the adjacent pixel electrode, the first and second portions of the pixel electrode being provided in parallel with the signal line so as to be substantially adjacent to each other, and the pair of the signal lines is located completely between edges of the pixel electrode in the first portion;
   an opposed substrate on which a common electrode is provided; and
   a liquid crystal layer sandwiched between the active element substrate and the opposed substrate,
   a polarity of a voltage applied to one of two adjacent signal lines being opposite a polarity of a voltage applied to the other of the two adjacent signal lines.

5. A liquid crystal display device as set forth in claim 4, further comprising: a light-shielding pattern section provided on the active element substrate or on the opposed substrate, the light-shielding pattern section preventing light from being transmitted through gaps between pixel electrodes or through the active element.

6. The liquid crystal display device as set forth in claim 4, wherein: an operation mode is a TN mode.

7. The liquid crystal display device as set forth in claim 4, wherein: an operation mode is an MVA mode.

8. An active element substrate in a display device comprising:
   a plurality of signal lines; a plurality of scanning lines intersecting the signal lines; an active element provided proximate each intersection between the signal lines and the scanning lines; and a pixel electrode provided proximate each intersection between the signal lines and the scanning lines, the pixel electrode being superimposed at least on the signal lines, wherein:
   each of the signal lines includes a portion provided on a corresponding pixel electrode and a roundabout portion provided on a pixel electrode that is adjacent, in a direction parallel to the scanning lines, to said corresponding pixel electrode; and
   on at least one pixel electrode, a portion of a corresponding signal line and a roundabout portion of a non-corresponding signal line corresponding to an adjacent pixel electrode form a pair, and the pair is located between edges of the pixel electrode except those portions that lie between pixel electrodes, so that in a first portion of a pixel of said one pixel electrode the pixel electrode overlaps both the corresponding signal line and the roundabout portion of the non-corresponding signal line, and in a second portion of said pixel electrode the pixel electrode does not overlap either of the corresponding signal line or the non-corresponding signal line, wherein the first and second portions of the pixel electrode are parallel to each other as viewed from above.

* * * * *